United States Patent [19]

Perlman et al.

[11] Patent Number: 5,624,703
[45] Date of Patent: *Apr. 29, 1997

[54] MODIFIED FAT BLENDS

[75] Inventors: Daniel Perlman, Arlington; Kenneth C. Hayes, Wellesley, both of Mass.; Cecil Massie, Bloomington, Minn.

[73] Assignee: Brandeis University, Watham, Mass.

[*] Notice: The term of this patent shall not extend beyond the expiration date of Pat. No. 5,382,442.

[21] Appl. No.: 474,074

[22] Filed: Jun. 7, 1995

Related U.S. Application Data

[63] Continuation-in-part of Ser. No. 58,747, May 7, 1993, Pat. No. 5,514,407, which is a continuation-in-part of Ser. No. 883,642, May 15, 1992, Pat. No. 5,382,442.

[51] Int. Cl.⁶ ........................................................ A23D 7/00
[52] U.S. Cl. ........................................ 426/607; 426/601
[58] Field of Search .................................. 426/607, 804, 426/601

[56] References Cited

U.S. PATENT DOCUMENTS 5,382,442  1/1995  Perlman ............................... 426/607

FOREIGN PATENT DOCUMENTS

| 0340635 | 4/1989 | European Pat. Off. . |
|---|---|---|
| WO88/02989 | 5/1988 | WIPO . |
| WO92/04431 | 3/1992 | WIPO . |

Primary Examiner—Carolyn Paden
Attorney, Agent, or Firm—Foley & Lardner

[57] ABSTRACT

Cholesterol-reduced animal fat and vegetable oil are combined to form oxidation resistant blends. Such blends exhibit oxidative stabilities which exceed that of either component alone. In addition, these blends exhibit serum cholesterol lowering effects in mammals.

8 Claims, 20 Drawing Sheets

MODIFIED FAT BLENDS

BACKGROUND OF THE INVENTION

This application is a continuation-in-part of Perlman, et al., entitled "Modified Fat Blends", U.S. Ser. No. 08/058,747, filed May 7, 1993, now U.S. Pat. No. 5,514,407, which is a continuation-in-part of Perlman et al., entitled "Modified Fat Blends", U.S. Ser. No. 07/883,642, filed May 15, 1992, now U.S. Pat. No. 5,382,442, hereby incorporated by reference herein.

This invention relates to fat blends and methods for their manufacture and use.

Hayes et al., 53 *J. Clin. Nutr.* 491, 1991, and Khosla and Hayes, 55 M. *J. Clin. Nutr.* 51, 1992 (not admitted to be prior art to the present application) describe the effect of various fat blends formed from five different plant oils on plasma cholesterol and lipoprotein levels in non-human primates. The response to specific saturated fatty acids was assessed in three species of monkey known to differ in their susceptibility to atherosclerosis and in their plasma cholesterol response to consumption of saturated fat.

Pronczuk et al., 26 *Lipids* 213, 1991, describe experiments on the effect of various animal fats (butter, tallow, lard, and fish oil) upon three species of monkey. They state that substitution of fish oil for corn oil decreases plasma cholesterol despite the fish oil diet containing more saturated fatty acid than the corn oil diet.

Mensink and Katan, 323 *New England Journal of Medicine* 439, 1990, and Zock and Katan 33 *J. Lipid Research* 399, 1992 describe the deleterious effect of dietary trans fatty acids on depressing high density (HDL) and increasing low density (LDL) lipoprotein cholesterol levels in healthy subjects. Such a shift in the serum lipoprotein profile is thought to be atherogenic.

Hegsted et al., 17 *American Journal of Clinical Nutrition* 281, 1965, describe the effects of dietary fat on serum cholesterol in man. Test oils were used primarily incorporating them into recipes for many products such as waffles, muffins, cakes, cookies, pie crusts, biscuits, salad dressings, and spreads for bread.

Erickson, D. R. and List, G. R. (BAILEY'S INDUSTRIAL OIL AND FAT PRODUCTS, ed. T. Applewhite, vol. 3, pp. 273–304, 1982) report the relative reactivity of oleic (18:1), linoleic (18:2) and linolenic (18:3) acids as 1, 10, and 25, respectively. They compute the relative reactivity of common fats and oils by multiplying the decimal fraction fatty acids by the relative rate of reaction with $O_2$ of each fatty acid in the fat.

SUMMARY OF THE INVENTION

Applicant has discovered that specific blends of animal fats and vegetable oils or fish oils are effective in maintaining low serum cholesterol levels in mammals, such as humans and other primates. These blends are useful not only as dietary constituents that favorably modulate plasma cholesterol but also provide advantageous use in various cooking procedures, such as in deep-fat frying and baking, in dairy products e.g., frozen deserts (such as ice cream) or yogurt, creams, cheeses, spreads (such as butter/margarine blends), in diet drinks, in foods for specialized diets (e.g., hospital foods), and in other blended products, e.g., salad dressing, peanut butter, and margarines.

In this invention, the saturated fat portion of the blend is derived from animal fat and is initially reduced in its cholesterol content by use of a non-hydrogenation procedure, much as described by Marschner et al. in U.S. Pat. Nos. 4,804,555 and 4,996,072, hereby incorporated by reference herein and other equivalent methods known in the art, for example, employing supercritical fluid extraction, or extraction using cyclodextrans. Such fats are termed herein cholesterol-reduced. A cholesterol-reduced animal fat is defined as one in which the amount of cholesterol in the fat is reduced to less than 40, preferably less than 20 milligrams cholesterol per 100 grams of fat, or one which contains less than 50%, preferably less than 10%, of its original cholesterol content. Critical also in the invention, however, is the blending of the cholesterol-reduced animal fat with vegetable oil such that the final ratio of two key fatty acids (which can be determined by standard procedures) is greater than that of the cholesterol-reduced animal fat alone, preferably greater than 2, and still more preferably between about 2 and 9. These key fatty acids are linoleic acid (referred to as 18:2) and myristic acid (referred to as 14:0) and the ratio is the percentage of dietary energy calories (abbreviated as % energy) contributed by the linoleic acid divided by the % energy contributed by the myristic acid; i.e., 18:2 divided by 14:0. This % energy ratio is equivalent to the weight/weight ratio of these two fatty acids in the diet because both fatty acids have the same metabolic energy yields. That is, linoleic acid and myristic acids are metabolized in man to release approximately the same number of calories on a gram for gram basis. Thus, the ratio of percentages of dietary calories contributed by the fatty acids can be simplified to the weight ratio of the fatty acid components in the cholesterol-reduced fat blend. This ratio of fatty acids provides an index of metabolic value for the fat blend, i.e., it predicts the impact of the injected fat on the plasma cholesterol level when consumed by a human or animal. The overall effect on lowering of serum cholesterol concentration represents the combined impact of a favorable fatty acid ratio plus the benefit gained by removal of cholesterol from the animal fat. The combination of a suitably elevated 18:2/14:0 fatty acid ratio and the use of cholesterol-reduced fat act synergistically upon cholesterol levels in an animal consuming the claimed bends.

In addition, applicants have discovered that such blends of fats are particularly useful in deep-fat frying, and other uses described above (and listed in Table 5 below), compared to the individual fat or oil alone. Unmodified vegetable oils (i.e., non-hydrogenated) can only be used with difficulty in such processes since they are susceptible to oxidation upon being heated and agitated. The oxidation products are thought to be hazardous to health. Addis and Warner, *In Free Radicals and Food Additives*, eds. Auroma and Halliwell, Ch. 5, 1991; Addis and Hassel, *In Food Safety Assessment*, eds. Finley et al., Ch. 30, 1990; Park and Addis, *In Biological Effects of Cholesterol Oxides*, eds. Peng and Morin, Ch. 3, 1991; Addis and Park, *In Biological Effects of Cholesterol Oxides*, Ch. 4, 1991; and Zhang and Addis, 55 *J. Food Sci.* 1673, 1990. Addition of anti-oxidants to such vegetable oils is of relatively limited utility when the oil is heated to temperatures in excess of 100° C., and in particular at temperatures between 140° C.–170° C. (which are used in deep-fat frying). The combination of the vegetable oil and animal fat provides a blend which has advantageous oxidation properties, such that the blended polyunsaturated fatty acids are less readily oxidized in the presence of saturated fatty acids even when heated at the high temperatures described above. For example, the blend has an increased stability to oxidation when heated to 100° C., or greater, in air, at least 25% greater than the vegetable oil component heated separately from the animal fat component. In addition, the metabolic value of the animal fat, i.e., its effect on cholesterol metabolism is significantly improved by blending of the oil with the fat.

Thus, in a first aspect, the invention features a blended cholesterol-reduced animal fat and vegetable oil which are proportionally combined in amounts that provide a fat blend having a linoleic acid content (L) and a myristic acid content (M) as a weight ratio that is greater than that of the animal fat alone.

In related aspects, the invention features a method for making a blended fat composition by combining the above-mentioned fat and oil to provide the desired ratio described above, and a method for using the blend for cooking, for example, in deep-fat frying or the other uses described herein. The blending of the fat and oil is performed by standard procedure. Another related aspect of the invention features a method for hardening vegetable and fish oils by addition of cholesterol-reduced animal fat to produce solid shortenings and margarines. In yet another aspect, the blend is formed by combining one part by weight vegetable oil or cholesterol-reduced fish oil with between one and ten parts by weight cholesterol-reduced animal fat.

In preferred embodiments, the animal fat is highly cholesterol-reduced, i.e., the cholesterol concentration has been reduced between 90% and 99% of its original concentration; the ratio of fats is selected to provide a blend more stable to oxidation upon heating at temperatures in excess of 100° C. (and preferably more stable at temperatures between 140° C.–170° C.); the animal fat is tallow, lard, milk fat, mutton fat, chicken fat, egg fat, or turkey fat; the cholesterol-reduced animal fat contains between 3 and 40 mg cholesterol/100 grams tallow, between 5 and 40 mg cholesterol/100 grams butter fat, and between 2 and 30 mg cholesterol/100 grams lard; and the vegetable oil is one including linoleic acid, e.g., it is safflower oil, sunflower oil, corn oil, soybean oil, cottonseed oil, peanut oil, canola oil, olive oil or palm olein. In addition, cholesterol-stripped fish oil can be blended with other cholesterol-stripped saturated animal fats to stabilize the fish oil against air oxidation at room temperature (20°–25° C.).

Blends of this invention are believed to be advantageously less thrombogenic than the animal fat component alone, and potentially can be used as antioxidants in food formulations. Since excess 18:2 consumption is potentially deleterious, the proposed blends can be used to raise serum HDL levels and reduce serum LDL susceptibility to oxidation, and to reduce risk of cancer, arthritis and other adverse prostaglandin responses.

Other features and advantages of the invention will be apparent from the following description of the preferred embodiments thereof, and from the claims.

DESCRIPTION OF THE PREFERRED EMBODIMENTS

The drawings will first briefly be described.

DRAWINGS

FIGS. 1–10 are graphical representations of the amount of oxidation of various fats heated separately, compared with the same amounts of fats combined and heated as fat blends, measured by spectrometry at between 110 and 300 nm; specifically, FIG. 1 shows results obtained with a 1:1 beef tallow: corn oil mixture heated at 100° C. for nineteen hours (line (a)) and of the same beef tallow and corn oil heated separately and then combined after heating (line (b));

Figure 1:
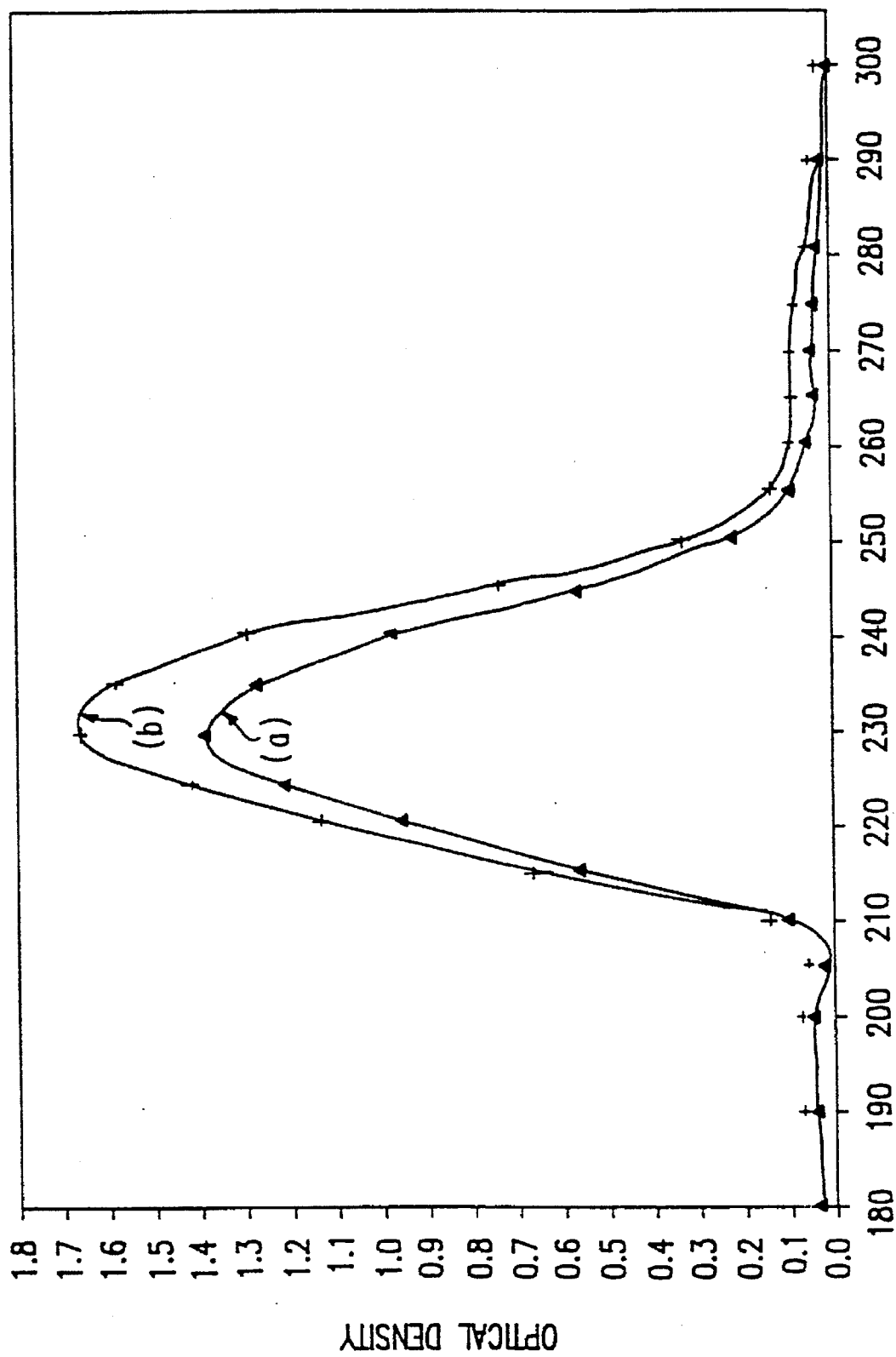
Figure 2:
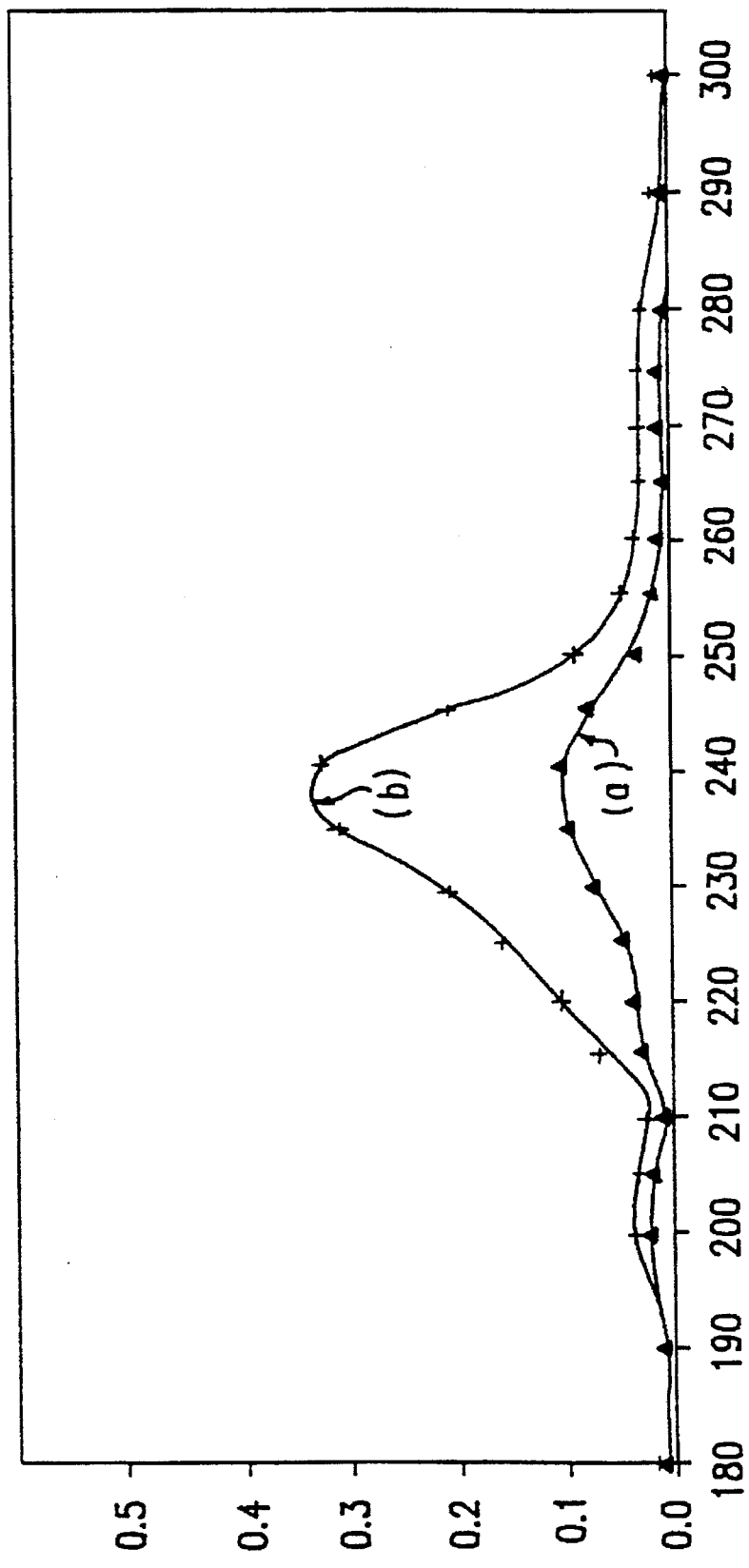
FIG. 2 shows the effect of heating at 100° C. for nineteen hours on the level of oxidation products of a blend of beef tallow and corn oil at a 9:1 ratio (line (a)), and of the same fat and oil heated separately (line (b))
Figure 3:
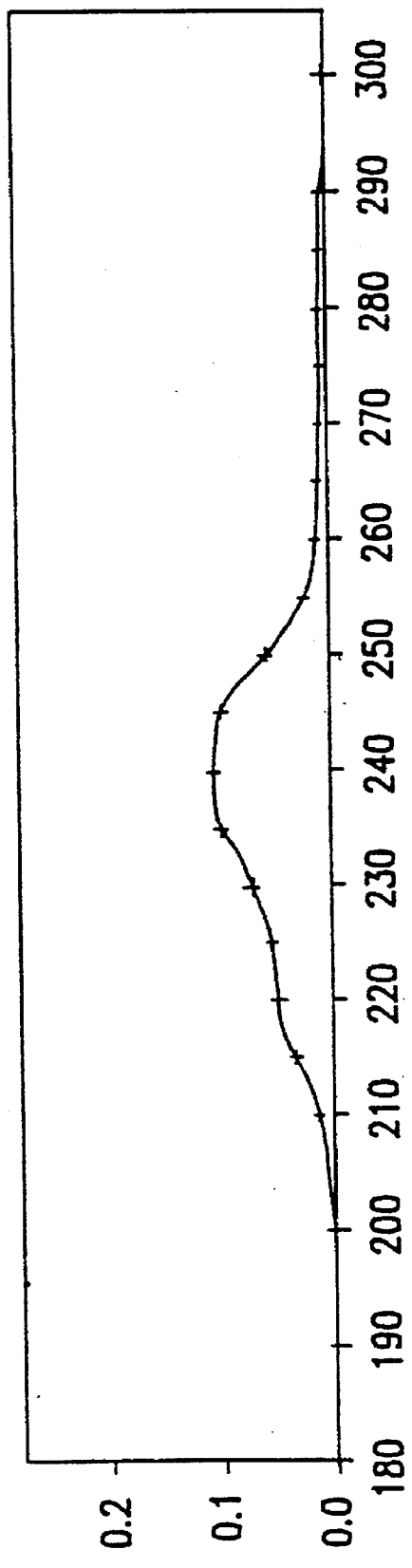
FIG. 3 shows the oxidation products of beef tallow heated alone at 100° C. for nineteen hours (control)
Figure 4:
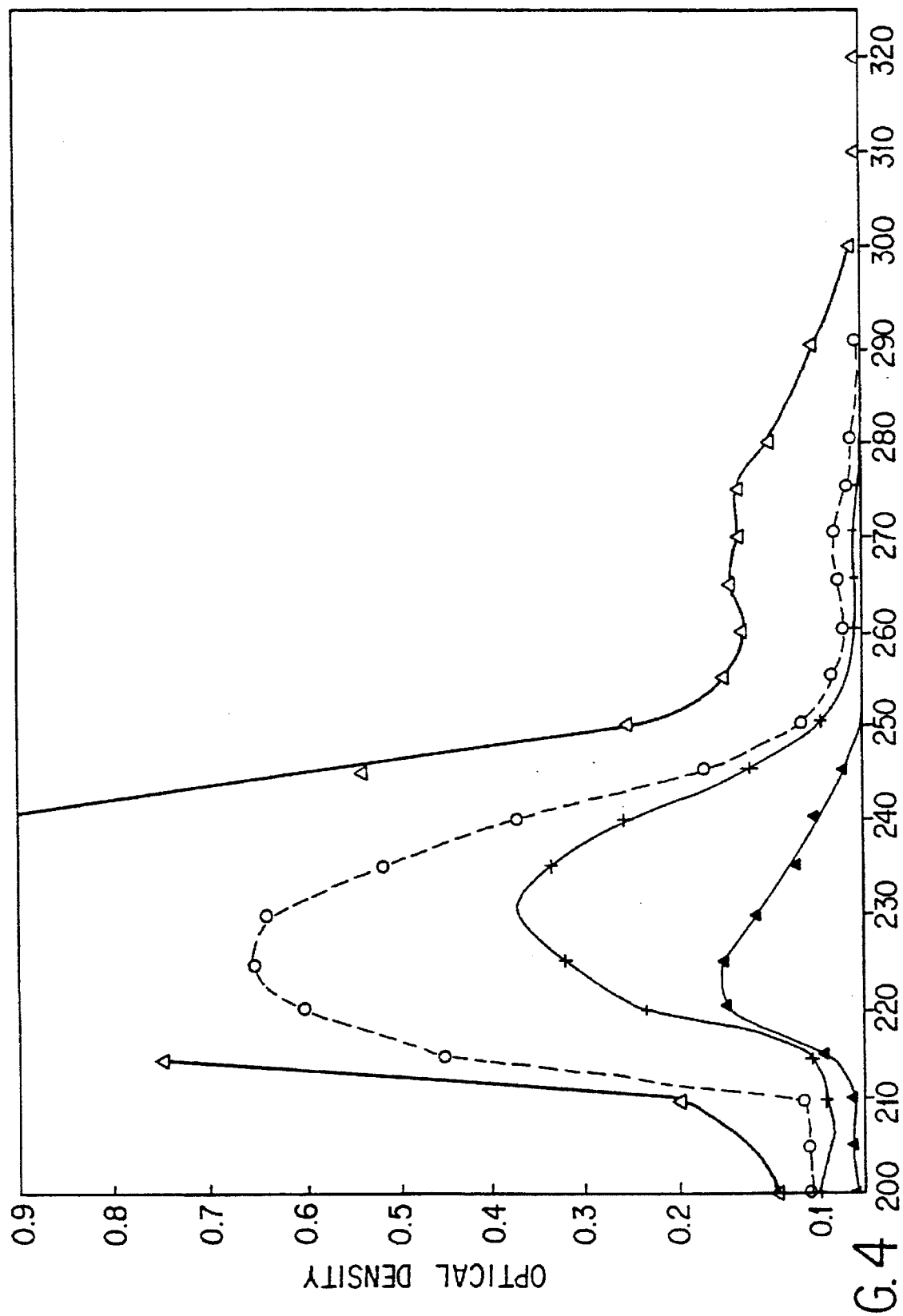
FIG. 4 shows the oxidation products of corn oil when heated at 100° C. for either seventeen or forty-one hours, either alone (1×) or diluted ten-fold (0.1×) in mineral oil.
Figure 5:
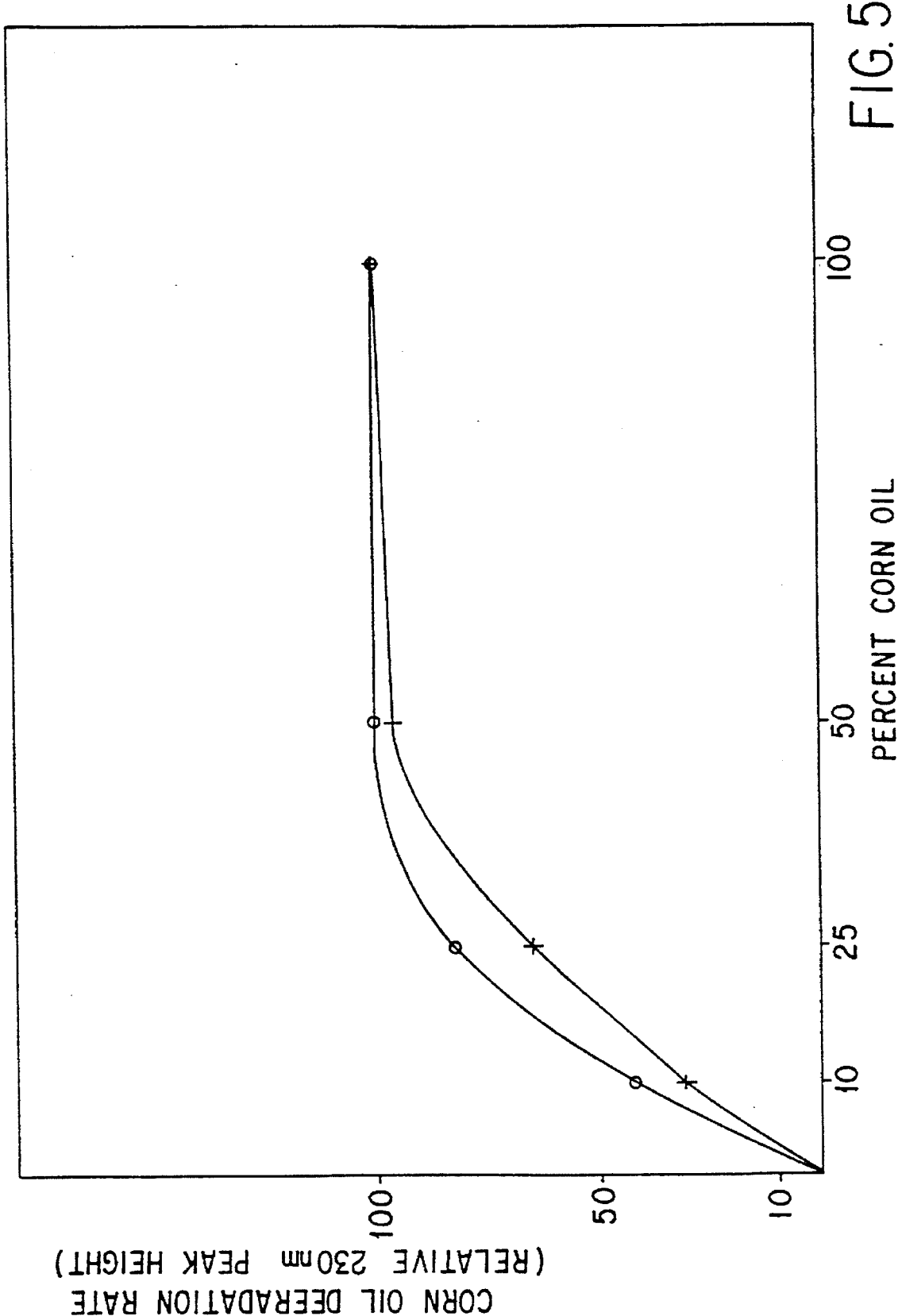
FIG. 5 is a graph showing the amount of oxidation products detected at 230 nanometers for corn oil mixed with varying amounts of mineral oil.
Figure 6:
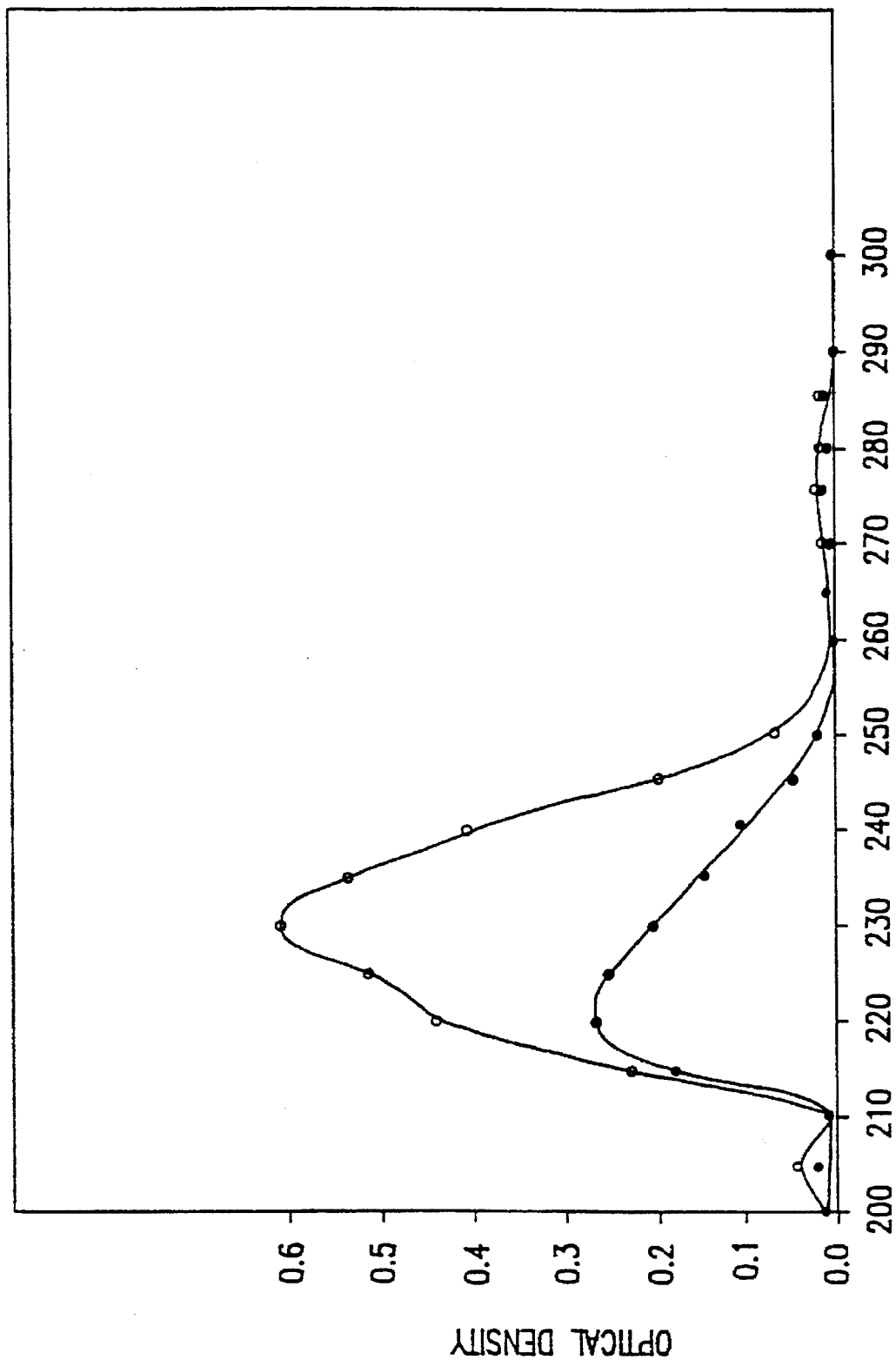
Figure 7:
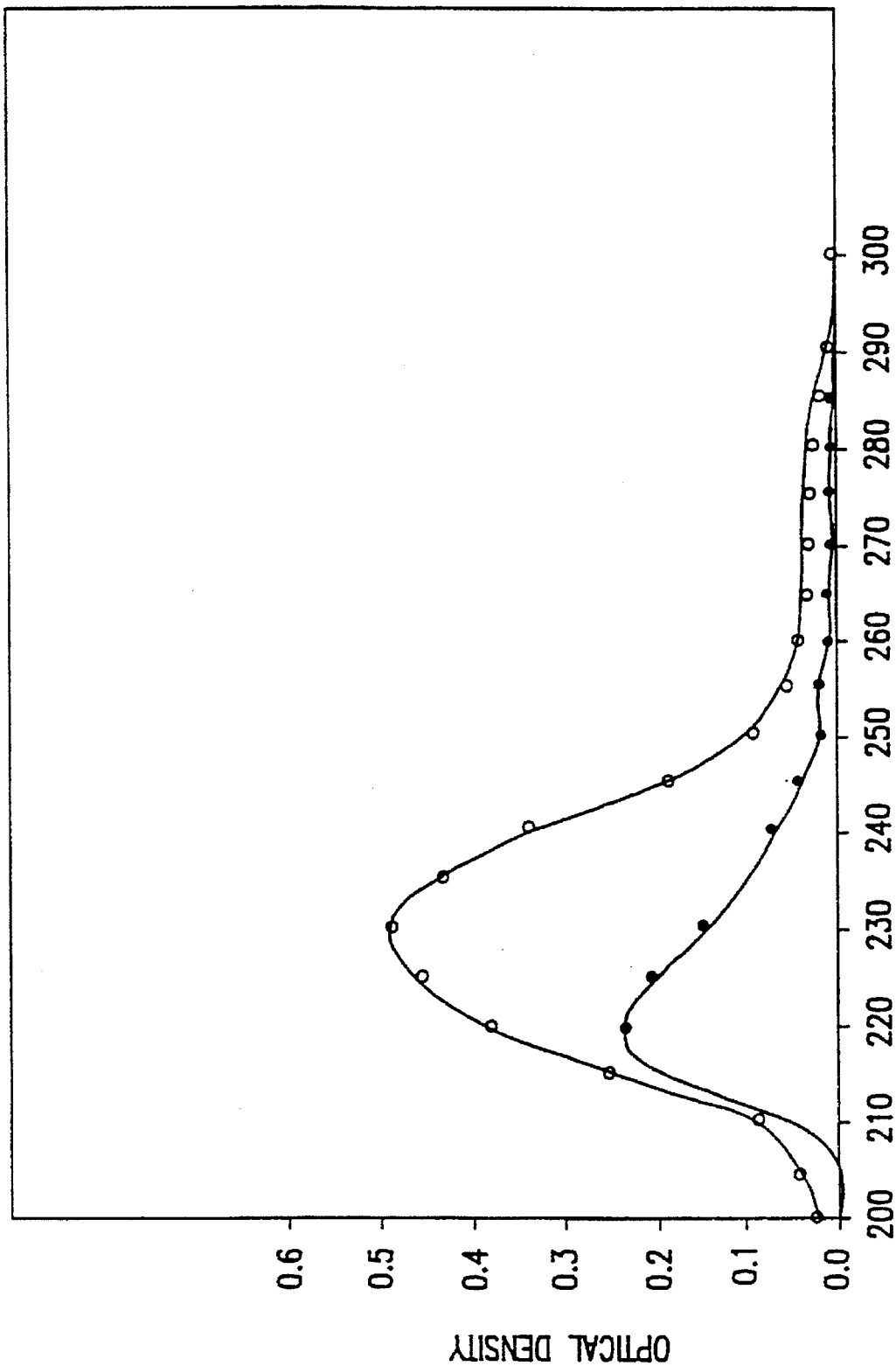
Figure 8:
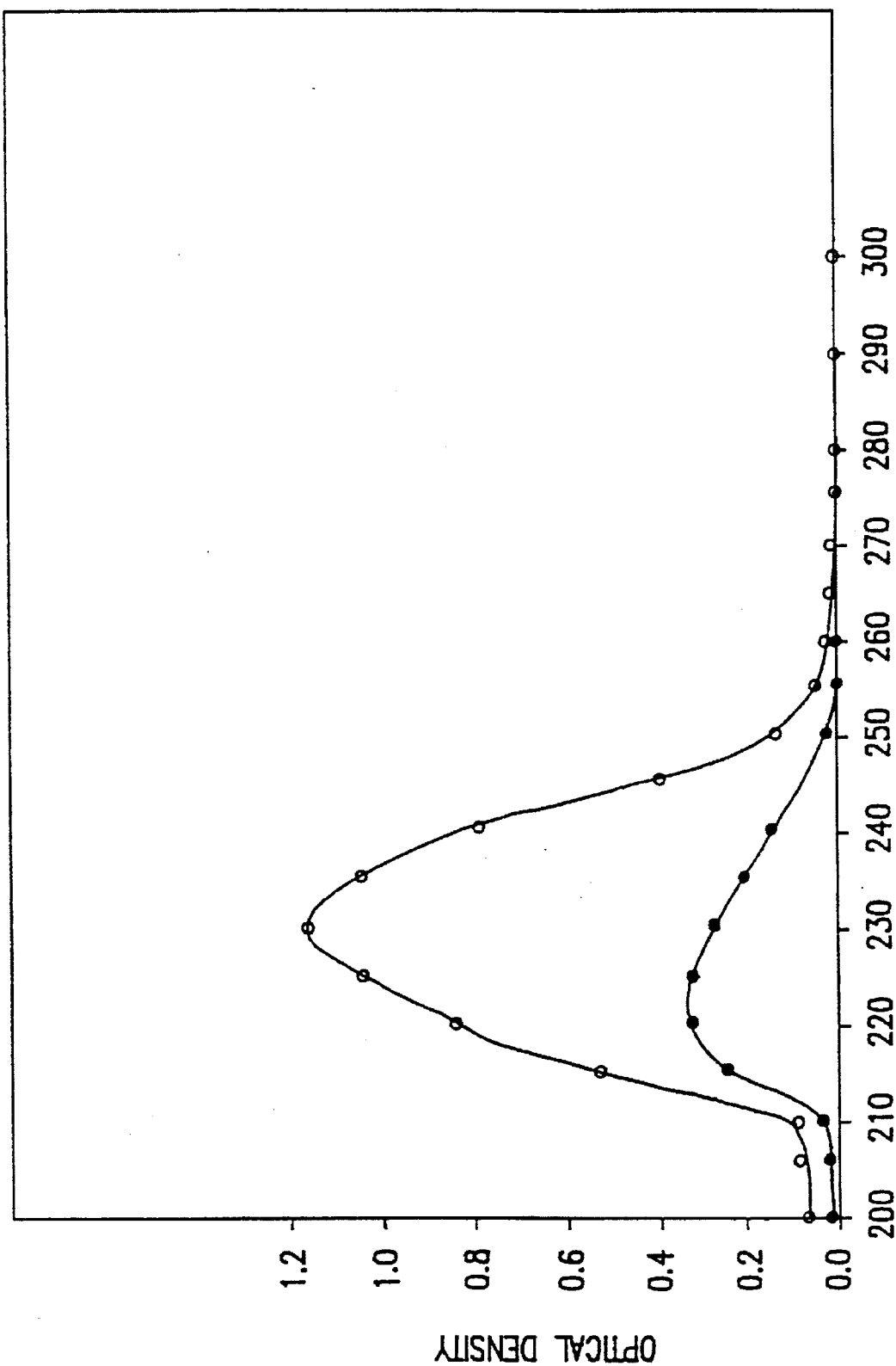
Figure 9:
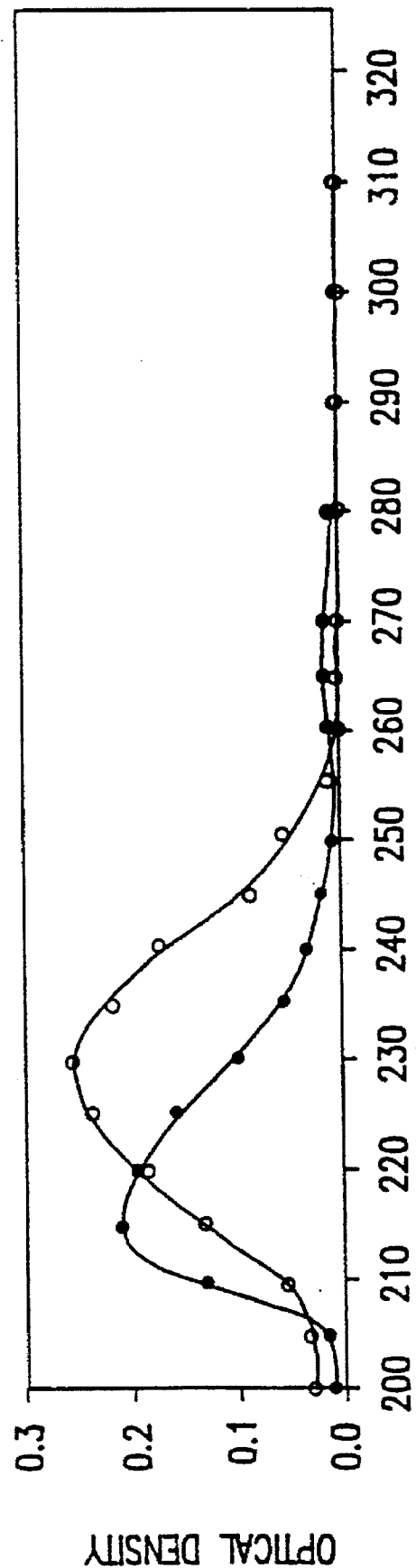
Figure 10:
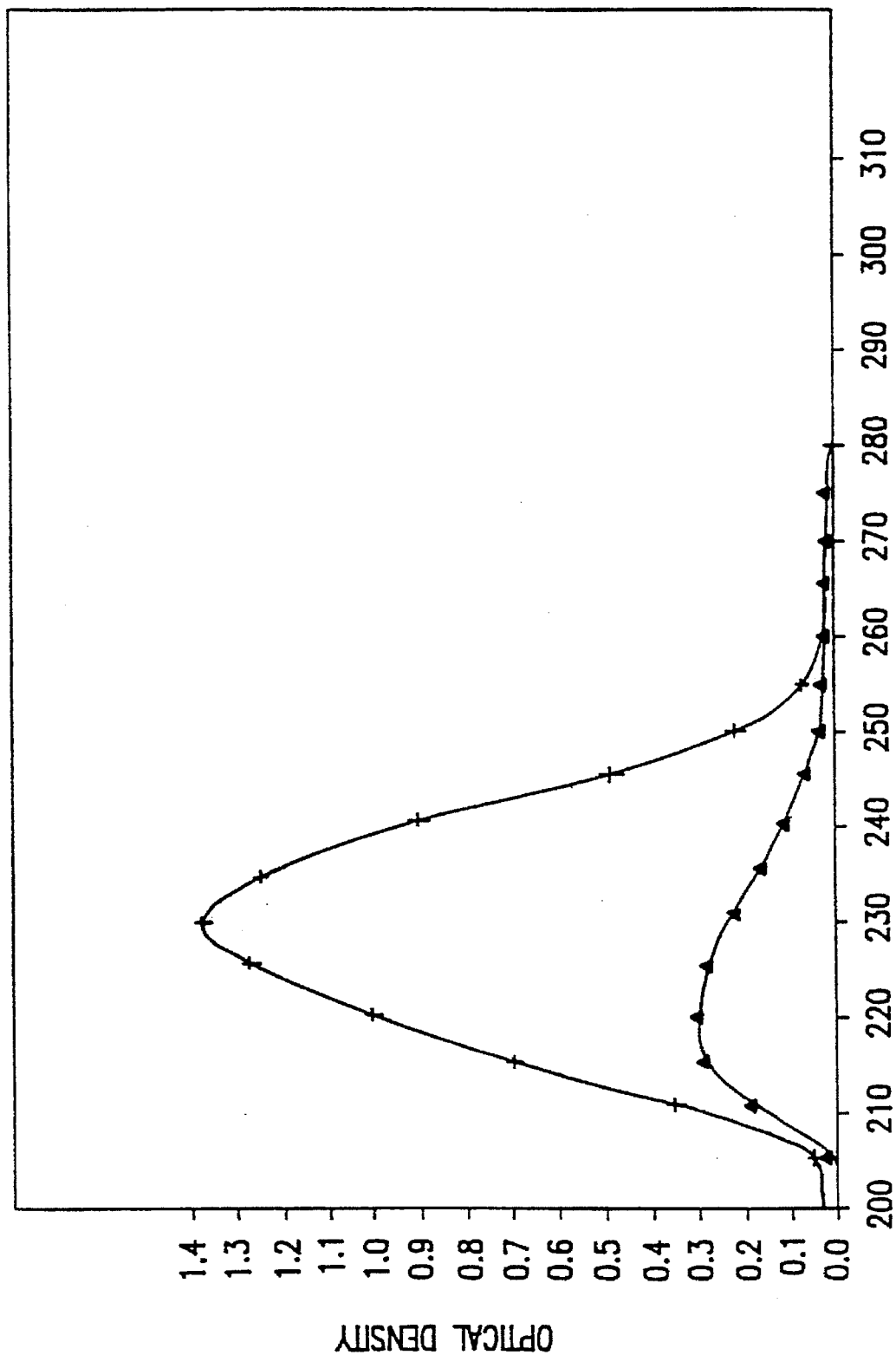
Figure 11:
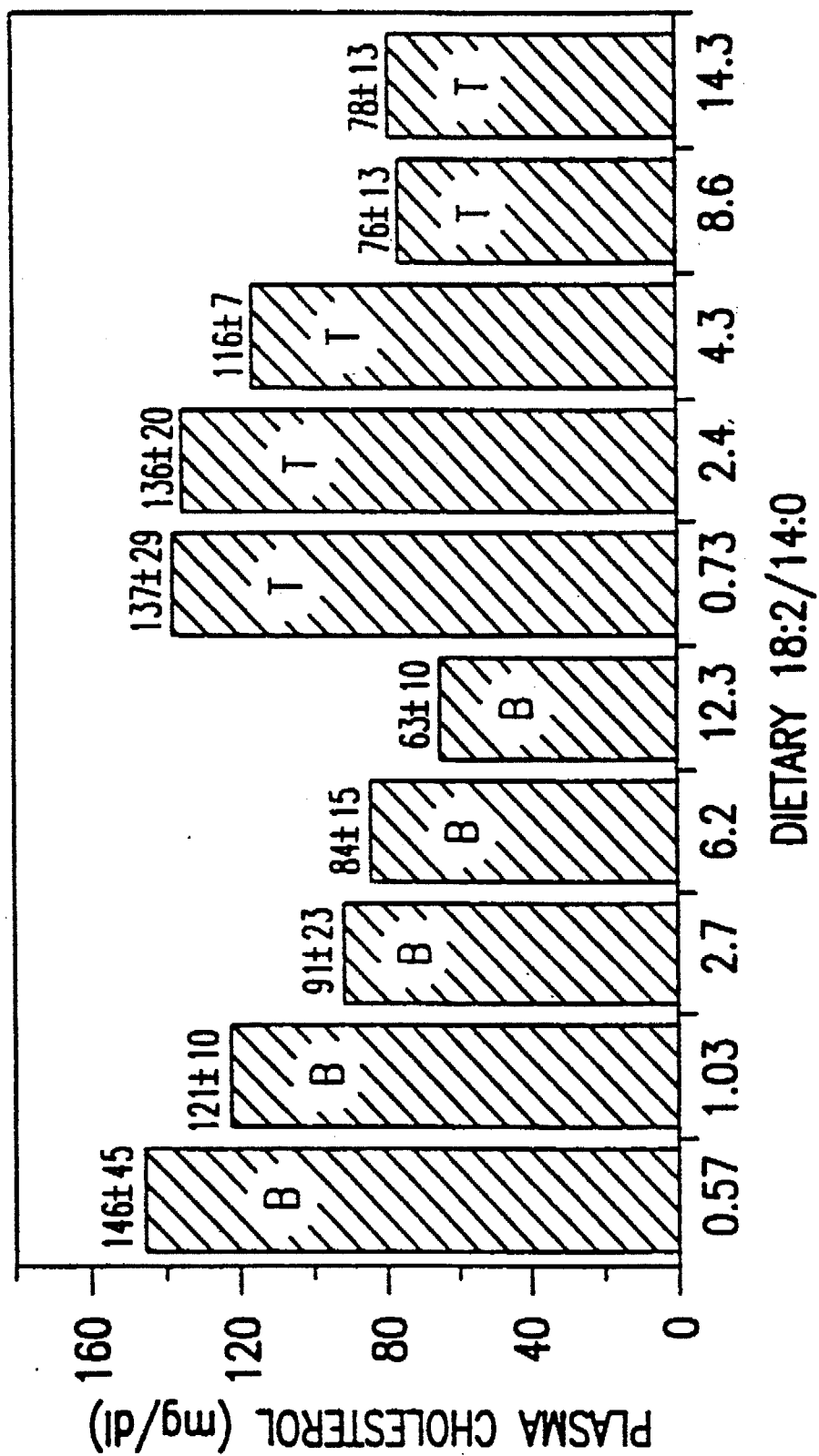
Figure 12:
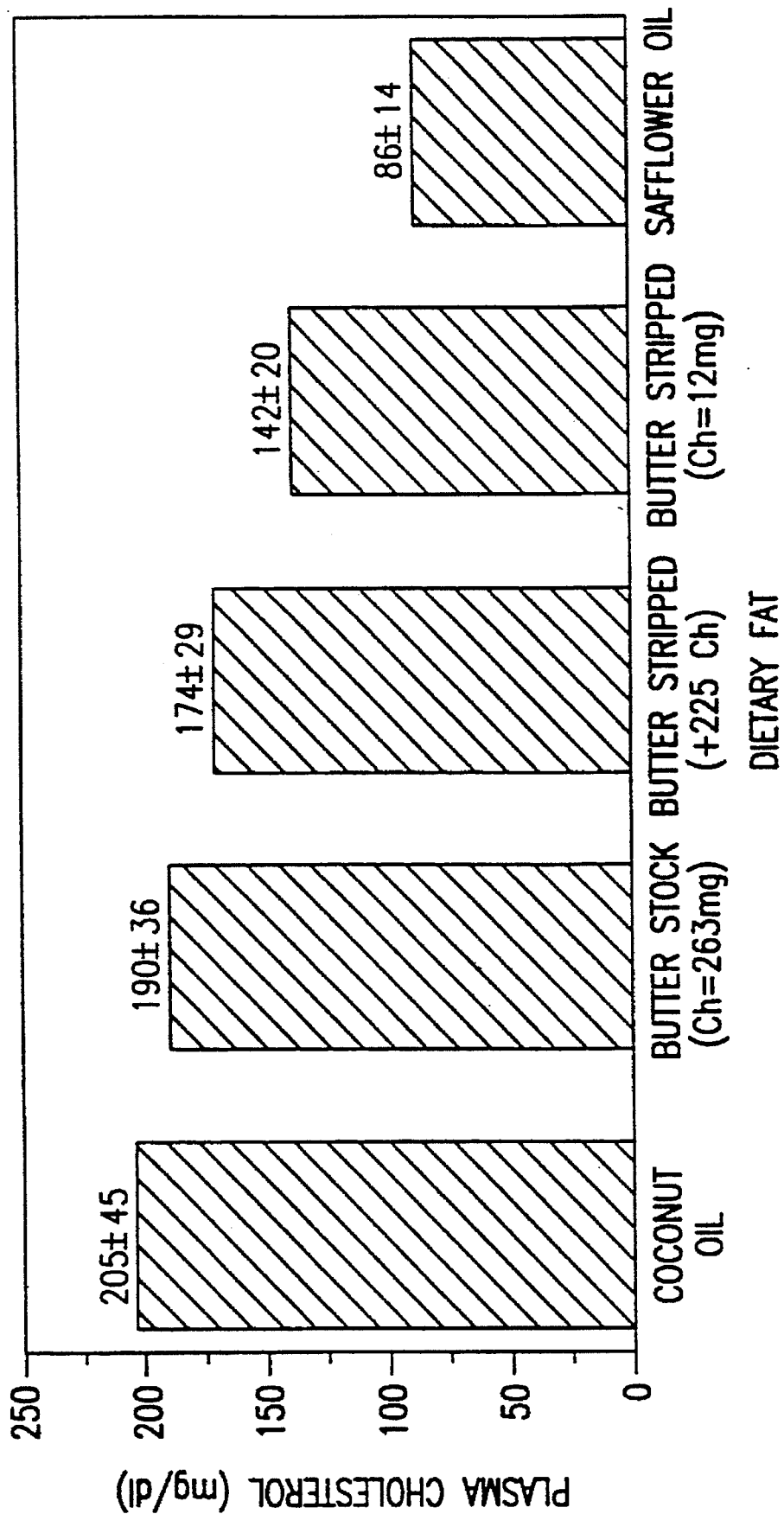
Figure 13:
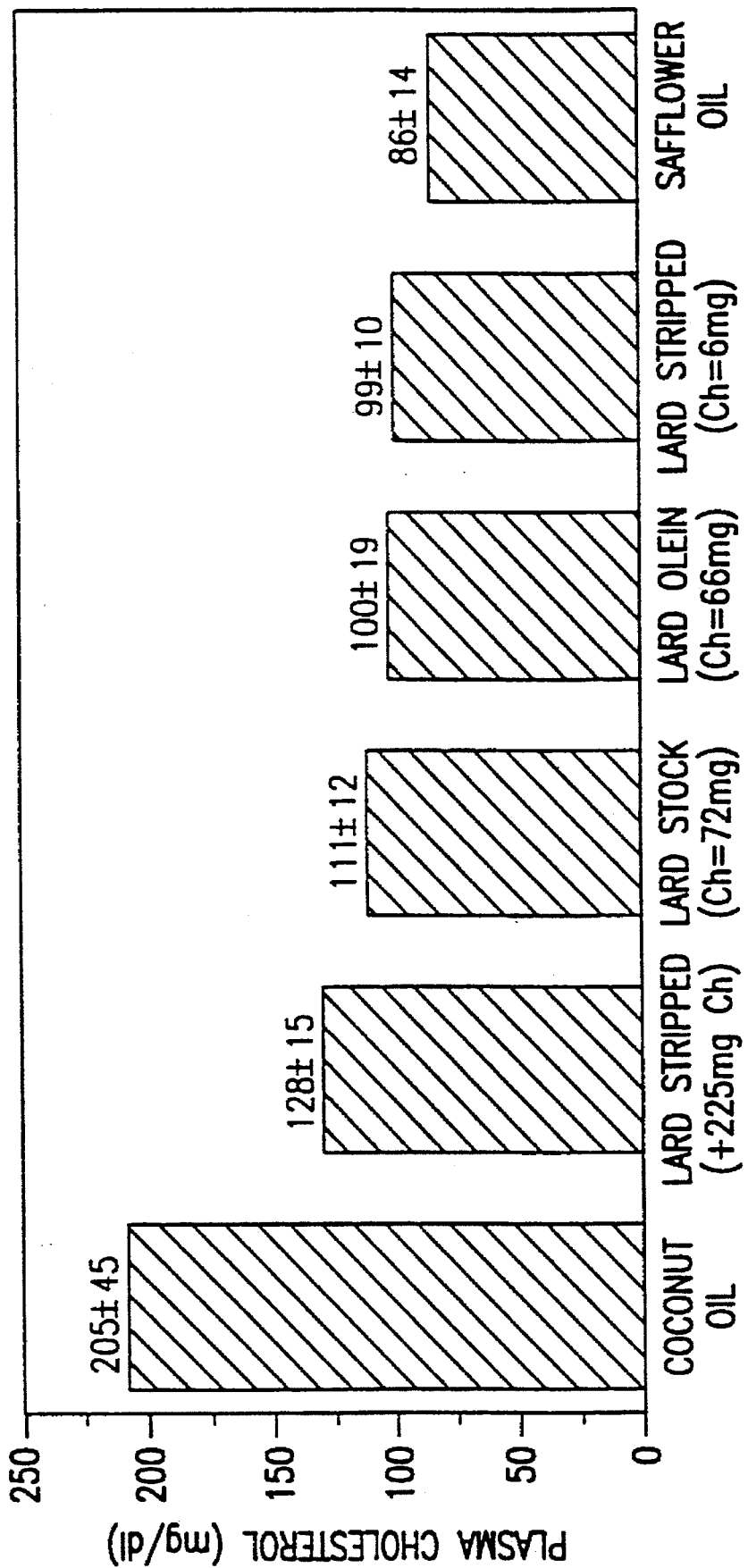
Figure 14:
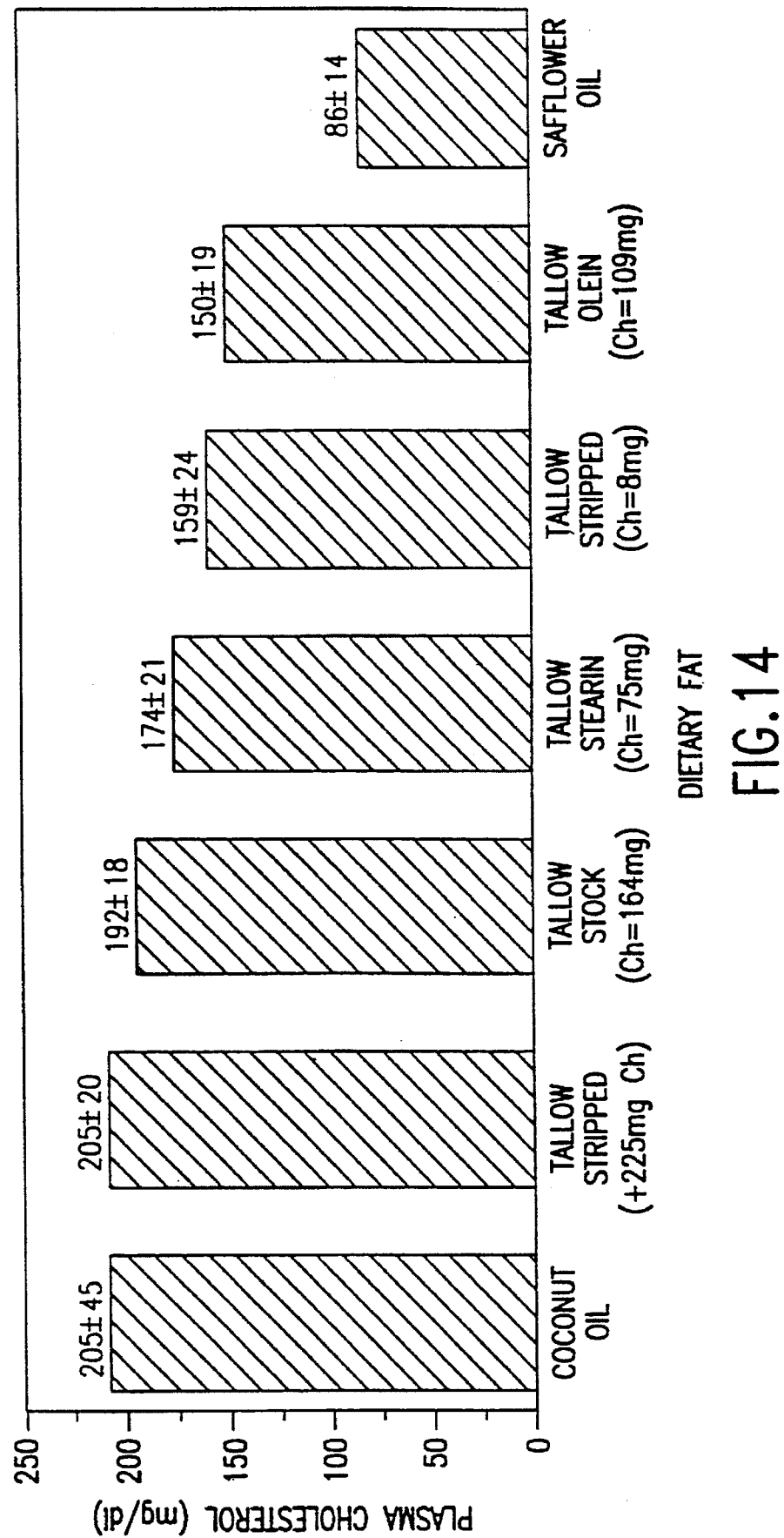
Figure 15:
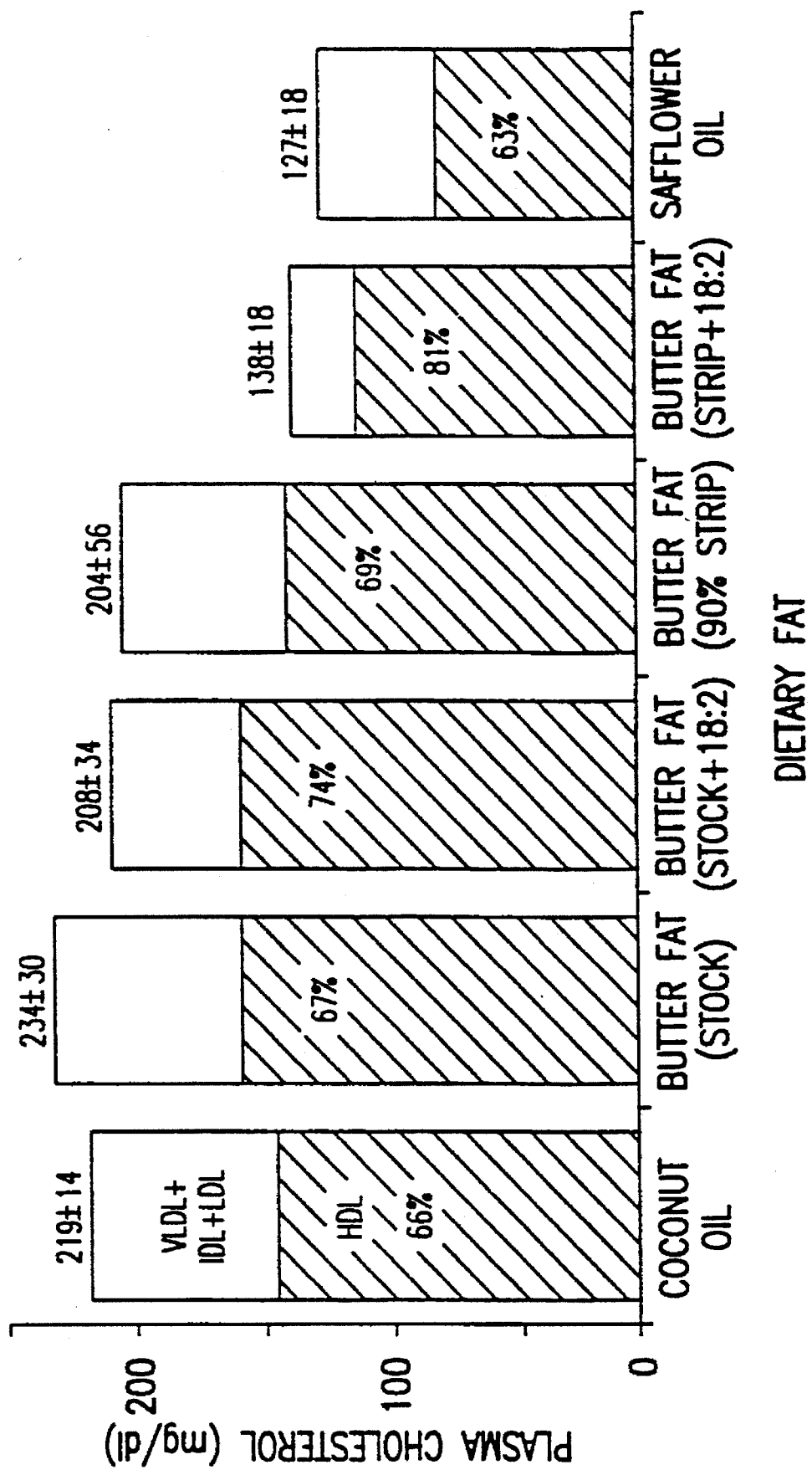

FIGS. 6, 7, 8, and 9 are graphs showing the effect of heating undiluted (1×) (or ten-fold diluted in mineral oil (0.1×)) soybean, canola, sunflower, and peanut oil respectively for seventeen hours at 100° C.;

FIG. 10 is similar to FIG. 9, but shows the effect of heating peanut oil for thirty-eight hours rather than seventeen hours;

FIGS. 11–15 are histograms showing the effect of various dietary fatty acid ratios on cholesterol levels in gerbils and hamsters; specifically FIG. 11 depicts the cholesterol response in gerbils fed a purified diet containing 40% energy as cholesterol-reduced butter (B, left group) or cholesterol-reduced tallow (T, starting with 6th column) with increasing amounts of safflower oil (left to right) to produce a final blend with the 18:2/14:0 ratio indicated on the lower axis. The nasal cholesterol (maximal lowering effect) is reached when the ratio is approximately 5.0 for tallow and 8.0 for butter. As discussed below, a lower ratio is effective with a butter blend since more can be added to compensate for its high 14:0 content, and once a "threshold", level of 18:2 is reached that level of 18:2 will have the desired cholesterol lowering effect;

FIG. 12 depicts the plasma cholesterol response in gerbils fed 40% energy as coconut oil (having a high saturated fatty acid content) or safflower oil (having a high polyunsaturated fatty acid content) and various forms of butter: 1) with its natural cholesterol load (263 mg); 2) cholesterol-reduced (shown as "stripped", to 12 mg per 100 gr); or cholesterol-reduced butter with cholesterol added back at 225 mg per 100 gr of fat. The benefit of reducing cholesterol levels is evident;

FIG. 13 compares the effect on gerbil plasma cholesterol levels of lard stock with that of cholesterol reduced lard, or the latter with 22 mg cholesterol added per 100 gr fat. A lard olein fraction is also compared in its effect;

FIG. 14 compares the effect on gerbil cholesterol levels of tallow stock, tallow fractions, or cholesterol-reduced tallow with or without 225 mg cholesterol per 100 gr fat;

FIG. 15 shows that the low (inadequate) level of 18:2 in stock butter fat contributed about +26 mg/dl plasma cholesterol, whereas the contribution from the cholesterol in butter was about +30 mg/dl. When both factors were adjusted, by reducing cholesterol levels and adding 18:2, (column 5), the response was −66 mg/dl, i.e., more than the −56 mg/dl predicted by adding the two individual factors together. The improved butter fat now approaches safflower oil in its metabolic profile. These data demonstrate the synergistic effect of cholesterol reduction and an improved 18:2/14:0 ratio which together form the basis of this invention.

The data generated in FIGS. 16–19 was obtained using vegetable oil-based, cholesterol-free, diets.

Figure 16A:
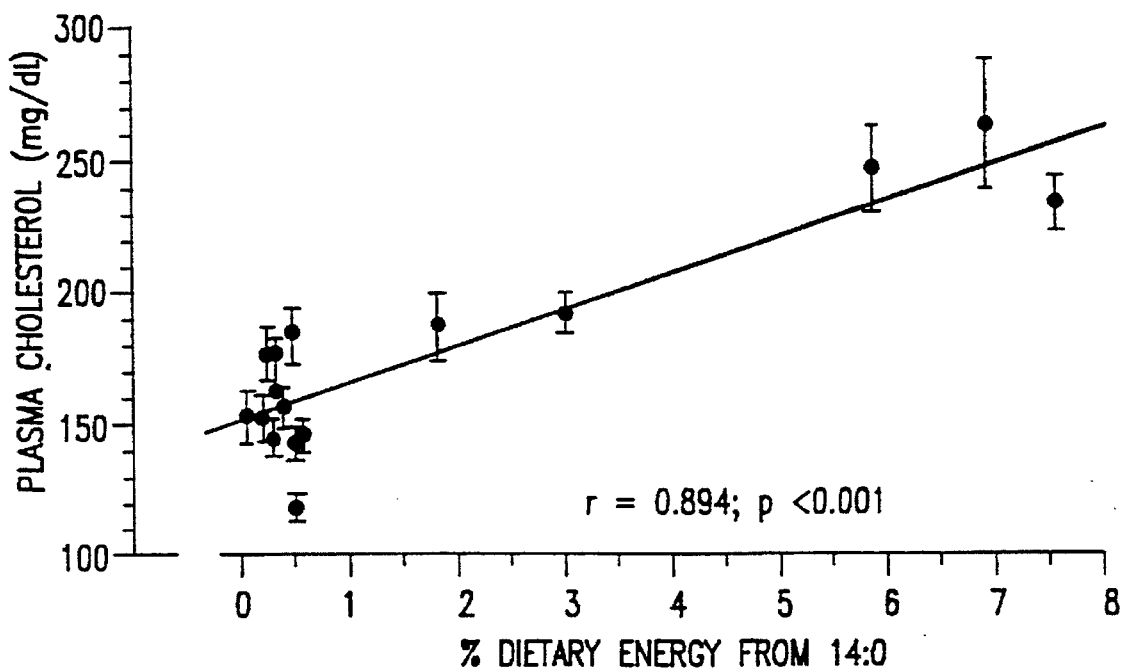
Figure 16B:
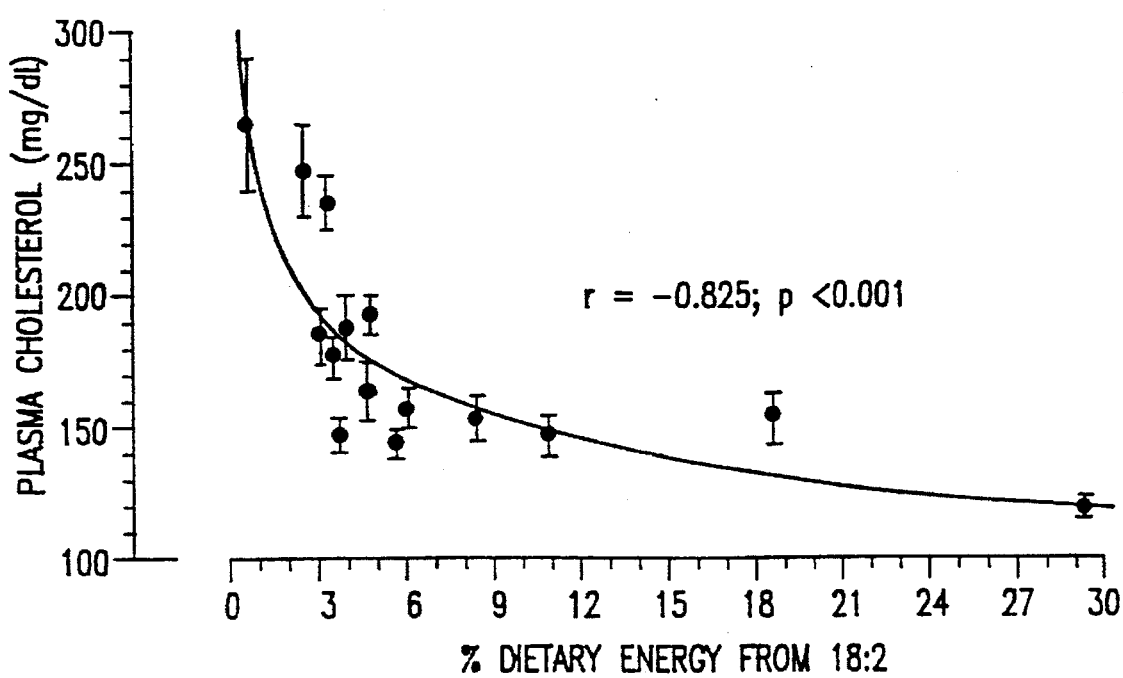

FIGS. 16A and 16B are graphs of plasma cholesterol levels (mg/dL) plotted against the specific % energy derived from 14:0 (FIG. 16A), or % energy from 18:2 (FIG. 16B).

Figure 17:
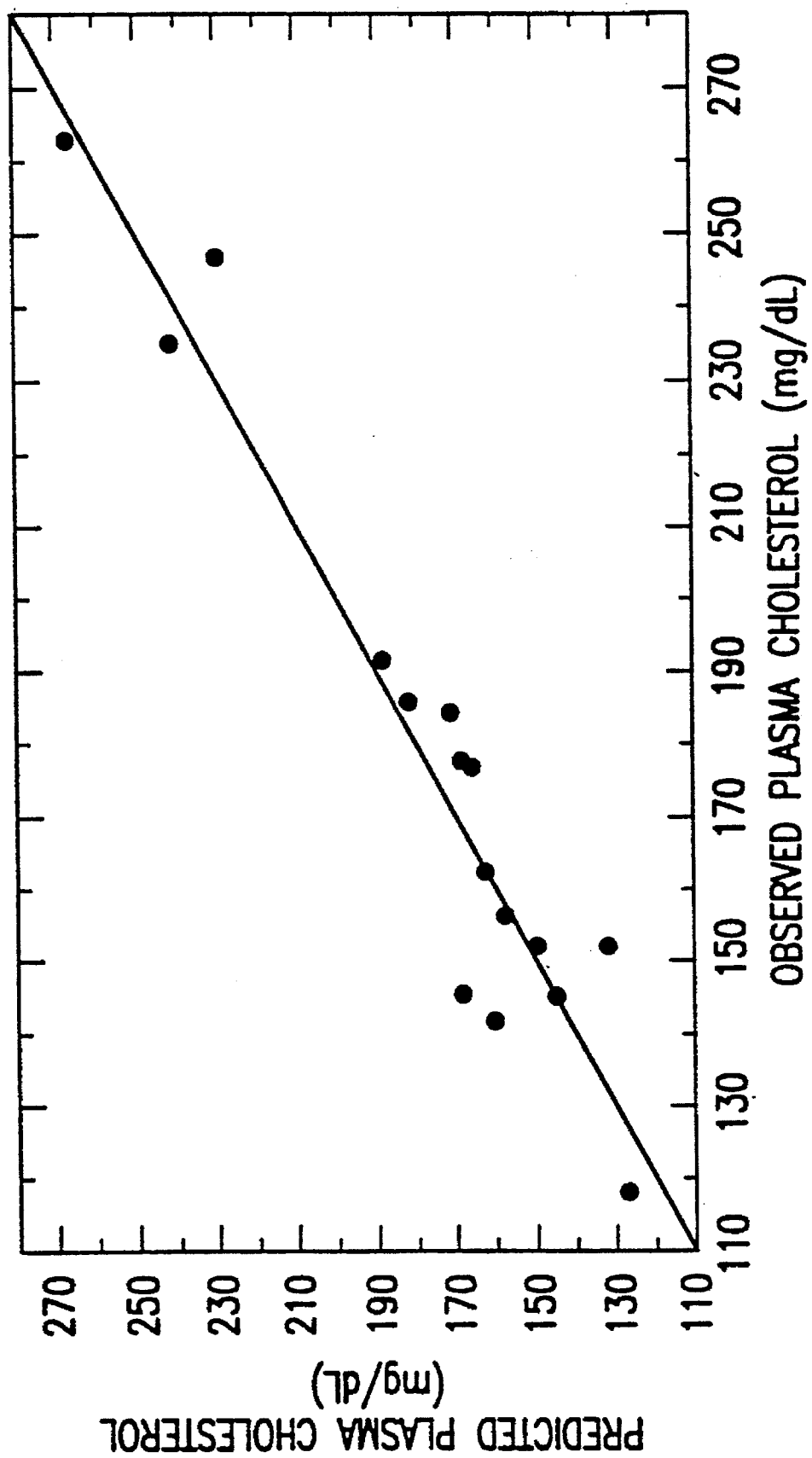

FIG. 17 is a graph of the observed plasma cholesterol levels (mg/dL) in cebus monkeys compared to that predicted from a multiple regression based on the % energy from 14:0 and 18:2.

Figure 18:
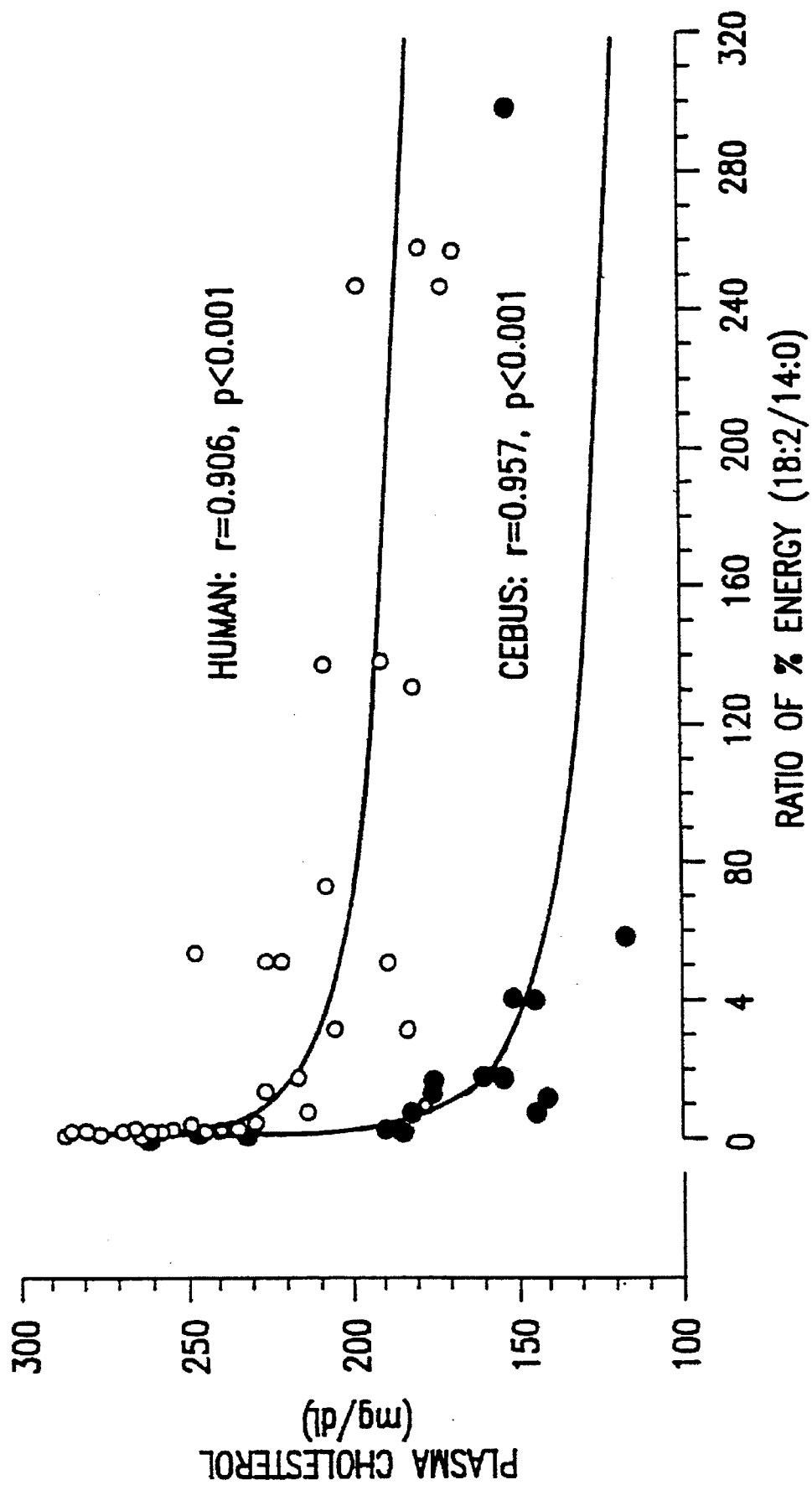

FIG. 18 is a graph of the ratio of % energy (18:2/14:0) to plasma cholesterol levels in humans and cebus monkeys.

Figure 19:
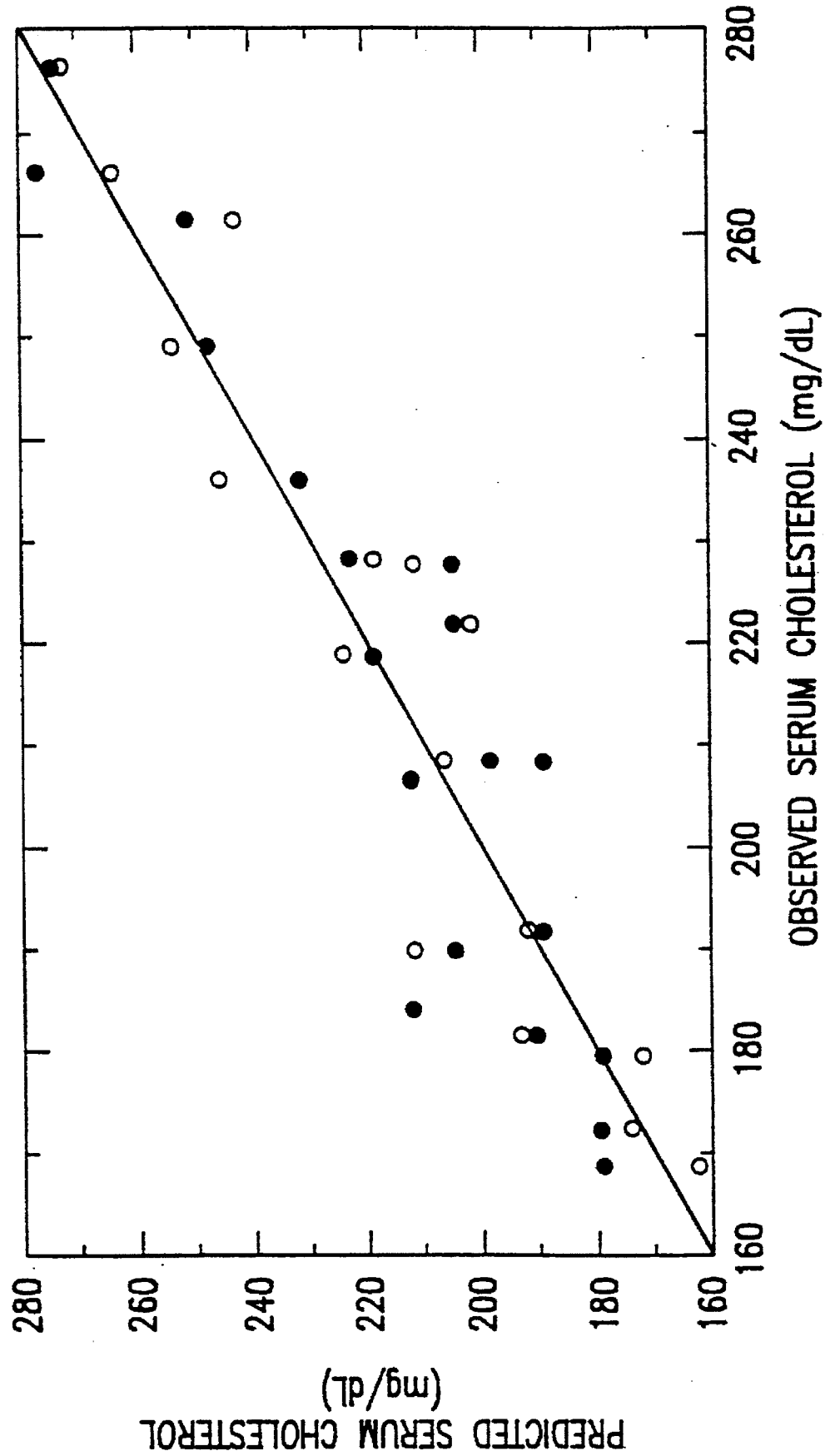

FIG. 19 is a graph of the predicted serum cholesterol compared to observed serum cholesterol (mg/dL) in cebus monkeys.

Figure 20:
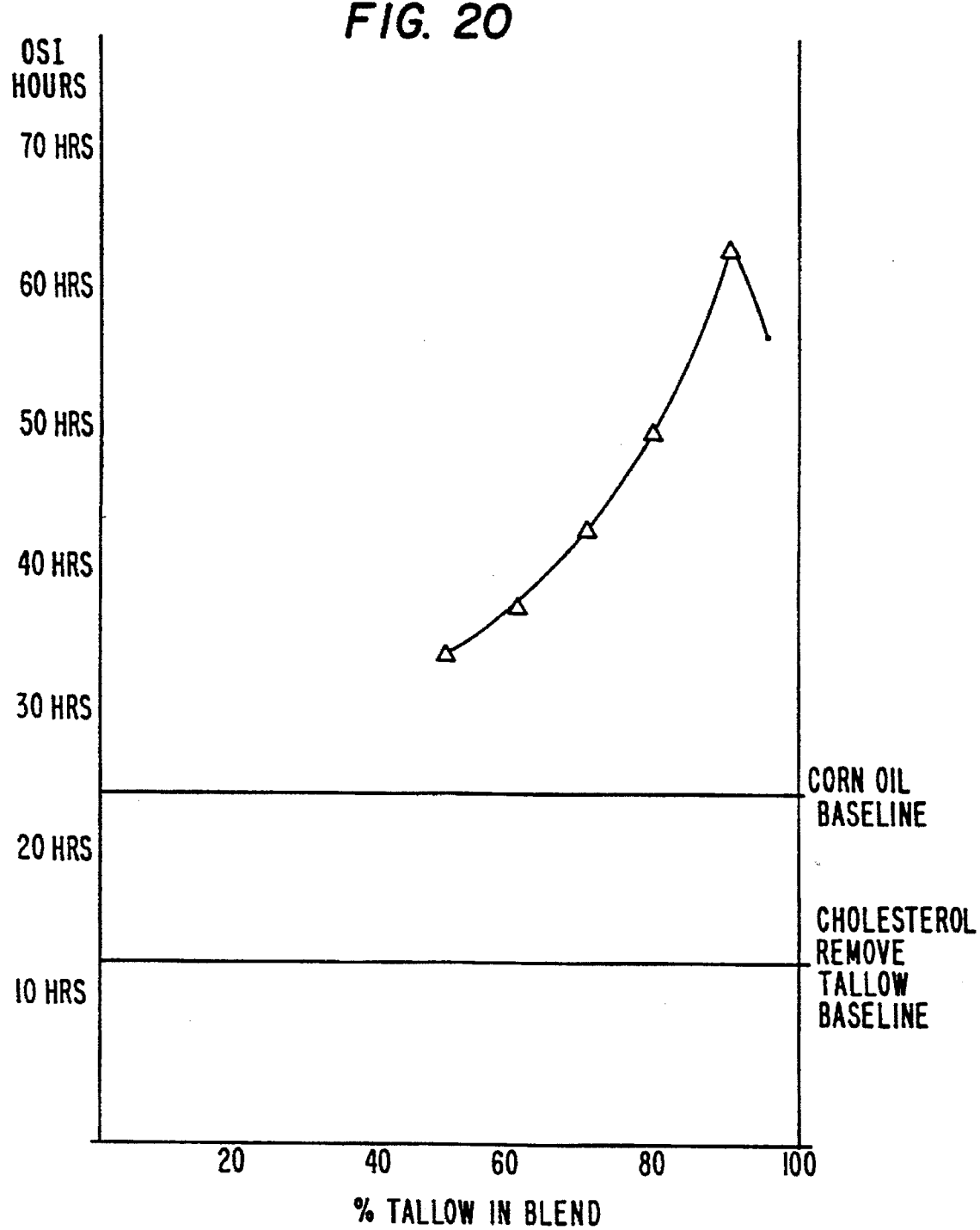

FIG. 20 is a graph of the oxidative stability index of a variety of cholesterol-reduced tallow/corn oil blends plotted against the oxidative stability index of corn oil alone and cholesterol-reduced tallow alone.

OXIDATION OF IMPROVED FAT BLENDS

One significant problem accompanying storage and cooking with a polyunsaturated fat is its susceptibility to air oxidation. The process of oxidation represents the peroxidation of linoleic and linolenic acids after which the fat becomes rancid and unpalatable. Antioxidant chemicals such as TBHQ (tertiary butylhydroquinone) may be added to a polyunsaturated fat but these are expensive and of limited utility in slowing peroxidation when the fat is being heated and agitated (e.g., during deep-fat frying) because they are absorbed by the food being fried and rapidly depleted from the oil. Brooks, 2(12) *Inform* 1091, 1991. Some of the oxidation products of polyunsaturated fats are known to be toxic, atherogenic, and/or carcinogenic as discussed by Addis and coworkers in references cited above. Fats can be hardened by hydrogenation, but this process is costly and can also generate atypical fatty acid isomers that can be harmful to humans.

We have discovered that the rate of peroxidation of polyunsaturated fats (measured spectrophotometrically during the course of accelerated oxidation at 100° C. and above) can be significantly reduced by dilution of these fats with a saturated fat, such as beef tallow (or other edible fat or fat substitute which is relatively resistant to oxidation). Such dilution has the added advantage of improving the dietary utility of the saturated fat providing that the relative concentrations of specific fatty acids within the blend are within a desired range, as described below.

Dilution of polyunsaturated fats including corn oil, soybean oil, peanut oil, canola oil and sunflower oil with two or more volumes of saturated fats, significantly reduces the specific rate of peroxidation of the polyunsaturated fat (i.e., the rate of oxidation per gram of the polyunsaturated fat). For example, on a gram for gram basis, pure corn oil is oxidized twice as rapidly as corn oil which has been diluted with four volumes of beef tallow. This discovery is surprising since dilution of vegetable oils (containing natural antioxidants such as the tocopherols and the carotenes) into animal fats or other diluents containing relatively low concentrations or no antioxidants, would be expected to accelerate the rate of peroxidation.

EXAMPLE 1

Heat Resistant Blends

Referring to FIGS. 1–10, the effect of blending an animal fat acid (or mineral oil) and vegetable oil on the rate of oxidation of the fats is demonstrated. In each experiment shown in the figures, the relevant fat (fatty acid) acid mixture was heated at 100° C. for the time noted and the optical density recorded. The amount of conjugated diene and triene fatty acids formed by peroxidation of polyunsaturated fats was measured at an optical density between 210 and 250 nanometers. Heating the polyunsaturated fats (vegetable oils) separately from the saturated fats or fat substitutes, e.g., beef tallow or mineral oil, shows significant oxidation of the polyunsaturated fatty acid components. Mixing at a ratio of 1:1 provides a small improvement in the oxidation stability of the vegetable oil, and mixing at a ratio of 9:1 animal to vegetable oil provides a significant improvement, i.e., lesser amounts of oxidation.

These findings, together with the data provided below for cholesterolemia demonstrate that the advantages of a reduced serum cholesterol level, and an improved blend resistant to oxidation, can both be achieved by using blended fat compositions containing between two and ten parts of a saturated fat source (such as tallow) to each part of polyunsaturated fat (such as corn or soybean oil).

The current practice of utilizing partially hydrogenated, i.e., hardened polyunsaturated fats, introduces the metabolically undesirable (i.e., atherogenic, see above) trans fatty acids as opposed to natural unsaturates. The present invention substitutes cholesterol-reduced naturally solid saturated fats mixed in a blend with natural liquid forms of polyunsaturated oils or cholesterol-reduced fish oils to produce a solid at room temperature, oxidation-resistant, heat-stable, cholesterol-lowering fat blend, e.g., in the form of a shortening. This allows production of a deep fry cooking fat with optimal physical and metabolic (cholesterol control) properties, while maintaining a completely natural (unhydrogenated) product.

Cholesterol Lowering Blends

Studies of the influence of dietary fat saturation and cholesterolemia are almost 40 years old. From the earliest observations (on the ability of vegetable oils to lower plasma total cholesterol relative to animal fats) to the more recent findings of the Lipid Research Clinics Coronary Primary Prevention Trial (involving more than 6000 subjects), it has been clearly established that saturated fats raise plasma cholesterol whereas polyunsaturated fats lower it. (National Research Council, Committee on Diet and Health Food and Nutrition Board Commission on Life Sciences: in *Diet and Health: Implications for Reducing Chronic Disease Risk* National Academy Press, Washington, D.C. 1989). These findings led to mass introduction of polyenes in the market place (since the 1950's) which doubled the typical polyene consumption from 1940 to 1985 from 2.5% energy to 5.4% energy (Stephen et al., "Trends in individual consumption of dietary fat in the United States", 52 *Am. J. Clin. Nutr.* 457, 1990). The rise in polyunsaturated fat intake has been associated with a peak and decline in coronary heart disease and serum cholesterol (Commission on Life Sciences, 1989, supra). However, despite this vast body of data, much confusion persists concerning the effects of specific fatty acids, and more importantly, about the underlying mechanism of their action on LDL and HDL dynamics.

Dietary fatty acid interrelationships are important because the LDL/HDL ratio appears critical to the atherogenic potential of the lipoproteins. Applicant believes that a proper balance in the fats and oils (specifically the fatty acids) consumed will enhance the circulating lipoprotein profile. Amongst the saturated fatty acids, those containing twelve to sixteen carbons (12C–16C; lauric, myristic and palmitic acid, respectively) were historically thought to raise the plasma cholesterol and LDL-C, whereas those containing less than 12C or the 18C, stearic acid, were considered neutral. The monounsaturated fatty acid oleic acid (18:1), has no effect on plasma cholesterol when exchanged for carbohydrate, but exerts a cholesterol-lowering effect (both LDL and total) when exchanged for saturated fatty acids. Similarly, the major polyunsaturated fatty acid, linoleic acid (18:2), is cholesterol-lowering, both independent of other fatty acids, but especially when exchanged for dietary saturated fatty acids. However, 18:2 also lowers HDL-C at high intakes (>20% energy, Mattson et al., 26 *J. Lipid Res.*194, 1985).

Applicant has found that, in normocholesterolemic individuals and when dietary cholesterol is less than 300 mg/day, 18:2 and 14:0 are the two key fatty acids that affect the plasma lipid profile. The response exists across species and the effect of 18:2 is nonlinear, i.e., there is a "threshold" level of 18:2 above which a further effect on plasma cholesterol is minimal. Thus, in the absence of dietary cholesterol and in subjects with normal LDL receptor activity, 14:0 appears to be the only fatty acid that raises (in a linear fashion) the plasma cholesterol, whereas 18:2 (because of the nonlinear response to 18:2) lowers it up to a certain "threshold", level of dietary 18:2. This is most graphically described by the dietary ratio of the percentage of dietary calories consumed as 18:2 vs. 14:0 % energy. However, accurate prediction requires the use of a multiple regression equation involving the two fatty acids. Palmitic and oleic acids appear to be neutral in these situations.

EXAMPLE 2

Optimized Fat Blends

Referring to FIGS. 11–15, these data demonstrate the plasma cholesterol response to variations in dietary 18:2/14:0 ratios. These data were generated using animal fat with a reduced cholesterol concentration (as described in Marschner et al., supra) and show that the ratio of 18:2/14:0 is a useful predictor of the effect of a chosen blend on the cholesterol response in animals (including humans).

Young adult male gerbils were fed purified diets, containing 20% (w/w) fat (40% of dietary calories) for 4 weeks at which time plasma cholesterol and triglyceride concentrations were determined. The choice of fat ranged from coconut oil (86% saturated fatty acids) to safflower oil (9% saturated fatty acids). In addition, stock supplies of three animal fats (butter, lard, and tallow) or these three fats reduced in cholesterol were fed to the animals. A detailed description of the basic diet and feeding protocol is published in 122 *J. Nutr.* 274, 1992. Dietary cholesterol was also added back to the cholesterol-reduced product and fed to a separate group of animals. In the case of tallow, special fractions of stearin and olein were fed as well.

The data clearly show the beneficial effect of removing cholesterol from the animal fats as evidenced by the reduction in plasma cholesterol concentration with butter (FIG. 12), lard (FIG. 13), and tallow (FIG. 14).

In FIG. 11 when graded amounts of 18:2 (supplied as safflower oil) were blended with either cholesterol-reduced butter or cholesterol-reduced tallow it was discovered that weight proportions of 1:4 (safflower oil/tallow) and 1:1.5 (safflower/butter) were necessary to lower the plasma cholesterol to basal values for gerbils (i.e., to 75 mg/dL) equivalent to 120–130 mg/dL for humans. Based upon the known 18:2 and 14:0 content of these separate fats, and consequently these fat blends, these weight proportions indicate that an enhanced 18:2/14:0 ratio, such as greater than 2, preferably greater than 4, and preferably between 2–9, is adequate to neutralize and actually lower the hypercholesterolemic effect normally associated with these two saturated animal fats (tallow and butter). Moreover, the data show that blending the fats within this range of 18:2/14:0 ratios actually rendered the fats maximally hypocholesterolemic.

A single 18:2/14:0 ratio applicable to all fat blends is not practical because (as the regression equation discussed below indicates) the cholesterol-lowering impact of increasing dietary consumption of 18:2 on serum cholesterol is logarithmic. To determine precisely what the ratio should be to neutralize or lower the plasma cholesterol, one must apply a full multiple regression equation as expressed for a particular animal species (see Table 1). This will indicate the exact percentage of dietary energy as calories (% energy) added as 18:2 which is required to counteract any given intake of 14:0. Since the regression equations for cebus, gerbils and humans are so similar, information obtained from cebus and gerbils is highly predictive of the humans response. This has allowed the formulation of optimum fat blends for humans.

TABLE 1

Regression Equations For Cholesterol Response to Dietary FAs: 4 Species Comparison

| | | |
|---|---|---|
| Gerbil PC[1/] | $= 126 + 8\ E_{14:0} - 40\ \log E_{18:2}$ | $r^2 = 0.91$ (25 diets) |
| Cebus PC | $= 192 + 10\ E_{14:0} - 48\ \log E_{18:2}$ | $r^2 = 0.92$ (16 diets) |
| Human PC | $= 229 + 8\ E_{14:0} - 36\ \log E_{18:2}$ | $r^2 = 0.85$ (17 diets) |
| Hamster PC | $= 160 + 5\ E_{14:0} - 26\ \log E_{18:2}$ | $r^2 = 0.74$ (13 diets) |

[1/]PC represents the predicted plasma cholesterol concentration. The constant term (e.g., 138 for gerbils) represents the reference plasma cholesterol value for a given species independent of any specific fatty acid impact. $E_{14:0}$ is the % energy as 14:0 in the diet, while $\log E_{18:2}$ is log % energy as 18:2 in the diet. $r^2$ represents the percent of total variation in plasma cholesterol explained by the regression equation (e.g., 95% for gerbil equation).

In summary, plasma cholesterol response to the dietary intake of 18:2 does not vary on a linear basis (i.e., it is logarithmic). Thus, a single 18:2/14:0 ratio (which implies a linear relationship) to provide the benefits of the present invention would be unrealistically limiting and an oversimplification of the data. However, the most beneficial hypocholesterolemic response in man achieved through this invention is obtained by preparing animal and vegetable oil blends whose 18:2/14:0 ratio based on weight percentage composition fall between 2 and 9. This range would represent dietary consumption between 10 and 25 grams per day 18:2 for an average human male. More precisely, ratios between 2 and 5 will neutralize (prevent the usual cholesterolemic effect caused by) the cholesterol-reduced saturated fat consumed alone. Ratios between 5 and 9 allow the fat blend to actually lower the plasma cholesterol concentration equal to the same extent as that induced by a polyunsaturated vegetable oil.

Referring specifically to FIG. 15, the synergistic effect of the ratio discussed above with use of cholesterol-reduced animal fat is demonstrated (column 5). The level of plasma cholesterol in hamsters is significantly less than expected from either feeding of cholesterol-reduced milk fat alone or feeding of the appropriate proportion of oil (polyunsaturated fatty acids) to the stock animal fat.

Primate Analyses

The above data on predictive values of fatty acid ratios were obtained with hamsters and gerbils. Below is provided an analysis of data obtained with monkeys and humans which demonstrates the universal applicability of the claimed ratio, and in particular its utility in humans. The following demonstrates that it is the ratio of dietary consumption of 18:2 and 14:0 that is critical to predicting the cholesterol response in normal individuals.

Results obtained in cebus monkeys (see below) indicate that dietary myristic (14:0) and palmitic (16:0) acids exert disparate effects on cholesterol metabolism, while the ability of linoleic (18:2) to decrease total plasma cholesterol displays an upper limit or threshold. Reanalysis of published data (see below) suggests a similar situation pertains in humans. 14:0 appears to be the principal saturated fatty acid that raises plasma cholesterol whereas 18:2 lowers it. Oleic acid (18:1) appears neutral. The effect of 16:0 may vary. In normocholesterolemic subjects consuming diets containing $\leq 300$ mg/day of cholesterol, 16:0 appears to be without effect on plasma cholesterol. However, in hypercholesterolemic subjects (>225 mg/dL) and especially those consuming diets providing cholesterol intakes of $\geq 400$ mg/day, dietary 16:0 may expand the plasma cholesterol pool.

EXAMPLE 3

Cebus Monkeys

The cebus was utilized because its plasma cholesterol is extremely sensitive to variations in dietary fat saturation. Although more sensitive than humans in the magnitude of their response, cebus respond in the same manner.

Applicant analyzed data accumulated from 16 dietary fat feeding trials in cebus monkeys over six years. Utilizing the approach originally used by Hegsted et al. (17 Am. J. Clin. Nutri. 281, 1965) to quantitate the effects of dietary fat on serum cholesterol in man, the data was subjected to multiple regression analysis to ascertain the ability of specific dietary fatty acids to predict the plasma cholesterol concentration.

The data base used for the analyses described herein represent a summary of results from various feeding studies over the six years in which cebus monkeys were fed 16 cholesterol free purified diets as described in Table 2. Diets 1 and 2, from Pronczuk et al., 26 Lipids 213, 1991 diets, 3–7 from Hayes et al., 53 Am. J. Clin. Nutr. 491, 1991, diets 8–10 from Khosla et al., 55 Am. J. Clin. Nutr. 51, 1992, diets 11–13 from Hegsted, supra, and diets 14–16 from Khosla et al., 6 FASEB. J. (Abstract 1992).

TABLE 2

Diets, percentage energy from dietary fatty acids, and the observed plasma cholesterol

| Diet$^a$(n)$^b$ | 12:0 | 14:0 | 16:0 | 18:0 | 18:1 | 18:2 | 18:3 | Plasma Cholesterol$^c$ |
|---|---|---|---|---|---|---|---|---|
| 1(4) | 0.00 | 0.06 | 3.69 | 0.68 | 7.78 | 18.57 | 0.19 | 152 ± 10 |
| 2(4) | 14.73 | 6.88 | 4.00 | 1.27 | 3.35 | 0.78 | 0.00 | 263 ± 25 |
| 3(8) | 14.82 | 5.83 | 3.32 | 1.02 | 2.91 | 2.64 | 0.28 | 246 ± 17 |
| 4(8) | 7.38 | 2.98 | 2.67 | 0.93 | 11.74 | 4.96 | 0.37 | 191 ± 8 |
| 5(8) | 4.15 | 1.80 | 7.78 | 1.12 | 11.53 | 4.12 | 0.25 | 186 ± 13 |
| 6(8) | 0.06 | 0.31 | 12.49 | 1.27 | 11.47 | 4.77 | 0.31 | 161 ± 11 |
| 7(8) | 0.12 | 0.22 | 7.25 | 1.21 | 12.74 | 8.43 | 0.84 | 151 ± 9 |
| 8(9) | 0.64 | 0.52 | 2.08 | 1.00 | 29.64 | 5.76 | 0.08 | 142 ± 6 |
| 9(9) | 0.92 | 0.56 | 16.28 | 1.92 | 15.64 | 3.92 | 0.16 | 145 ± 6 |
| 10(9) | 0.60 | 0.52 | 2.52 | 0.12 | 5.48 | 29.12 | 0.16 | 118 ± 5 |
| 11(10) | 19.12 | 7.52 | 4.28 | 1.32 | 3.76 | 3.40 | 0.36 | 233 ± 10 |
| 12(10) | 0.08 | 0.40 | 16.12 | 1.64 | 14.80 | 6.16 | 0.40 | 155 ± 8 |
| 13(10) | 0.16 | 0.28 | 9.36 | 1.56 | 16.44 | 10.88 | 1.08 | 145 ± 8 |
| 14(6) | 0.00 | 0.47 | 16.96 | 1.52 | 8.84 | 3.22 | 0.00 | 183 ± 11 |
| 15(12) | 0.00 | 0.31 | 11.19 | 1.27 | 13.80 | 3.44 | 0.00 | 177 ± 5 |
| 16(6) | 0.00 | 0.25 | 7.41 | 1.21 | 17.95 | 3.63 | 0.00 | 176 ± 10 |

$^a$Diets were fed with fat contributing either 31% energy (#s 1–7 & 14–16), or 40% energy (#s 8–13). All diets were cholesterol-free. The fatty acid composition of each diet was determined by GLC. Dietary fats were formulated (using either a single oil or blends of oils) as follows: 1, Corn Oil; 2, Coconut Oil; 3 & 11, 90% Coconut Oil/ 10% Soybean Oil; 4, 45% Coconut Oil/ 40% High Oleic Safflower Oil/ 15% Soybean Oil; 5, 45% Palm Oil/ 22% Coconut Oil/ 20% High-Olei c Safflower Oil/ 13% Soybean Oil; 6 & 12, 90% Palm Oil/ 10% Soybean Oil; 7 & 13, 45% Palm Oil/ 40% Soybean Oil/ 15% High-Oleic Safflower Oil; 8, High-Oleic Safflower Oil; 9, Palm Oil; 10, High-Linoleic Safflower Oil; 14, 95% Palm Stearin/ 5% High-Linoleic Safflower Oil; 15, 54% Palm Stearin/ 43% Olive Oil/ 3% High-Linoleic Safflower Oil; 16, 24% Palm Stearin/ 75% Olive Oil/ 1% High-Linoleic Safflower Oil.
$^b$Number of monkeys.
$^c$mg/dl plasma, Mean ± SEM.

The diets provides either 31% or 40% of the energy as fat with the range in % energy from the most predominant fatty acids as follows: 12:0 (0–19%); 14:0 (0–7.5%); 16:0 (2–17%); 18:0 (0.7–1.9%); 18:1 (3–30%); 18:2 (1–29%); 18:3 (0–1.1%). In all cases total cholesterol was determined enzymatically on fasting plasma samples.

The final data-set includes 129 cholesterol values generated from a group of 16 monkeys fed a total of 16 different diets. The composition of the diets has been detailed previously (Hayes et al., 53 Am. J. Clin. Nutr. 491, 1991; Khosla et al., 55 Am. J. Clin. Nutr. 51, 1992; Pronczuk et al., 26 Lipids 213, 1991, all hereby incorporated by reference herein). The dietary protein source was either lactalbumin (Diet #s 1–7, 11–16) or lactalbumin and casein (Diet #s 8–10). The fat source fed was either a single oil (Diet #s 1, 2 and 8–10) or blend of oils (Diet #s, 3–7 and 11–16) designed to isolate specific fatty acid effects. To ensure that the diets were essentially cholesterol-free, only vegetable oils were employed. These included coconut oil, corn oil, soybean oil, hi-oleic safflower oil, hi-linoleic safflower oil, palm oil, and olive oil. With the exception of two diets (each fed to four different animals) all diets were fed to 6–12 monkeys for 6–12 week periods. For all diets the fatty acid composition was determined by GLC (Hayes et al., 53 Am. J. Clin. Nutr. 491, 1991).

In an attempt to define the plasma cholesterol (PC) response in terms of its dietary fatty acid descriptor(s), the observed plasma cholesterol (mean for a given diet) was regressed against the dietary energy (% of total) contributed by a specific fatty acid(s) to generate the appropriate multiple regression equations. With seven dietary variables (the 7 major fatty acids) a total of 127 possible regression equations resulted. Calculations were carried out on a Macintosh Plus® computer (Apple Systems Inc., Cuperino, Calif.) using the Statview 512$^+$® (Brain Power Inc., Calabasca, Calif.) and Cricket Graph® (Cricket Software Inc., Philadelphia Pa.) statistical packages.

The 129 individual cebus plasma cholesterol (PC) responses to all 16 cholesterol-free diets averaged 174±4 mg/dL (mean±SE) with a range of 96–355 mg/dL, indicating that the inherent cholesterol level for this group of monkeys was essentially normal. On the basis of individual fatty acids (Table 3), myristic acid alone explained 80% of the variation in plasma cholesterol (Eqn C8) while linoleic acid accounted for 66% of the observed variation (Eqn C12). No significant relationship was observed when palmitic, stearic or linolenic acids were considered alone.

$$PC = 151 + 14 E_{14:0} \quad r^2 = 0.80 \tag{C8}$$

$$PC = 240 - 90.6 \log E_{18:12} \quad r^2 = 0.66 \tag{C12}$$

TABLE 3

Coefficients for Individual fatty acid regression in equations for cebus monkeys fed 16 dietary fats.

| | | | | Variable(s) | | | | | | |
|---|---|---|---|---|---|---|---|---|---|---|
| $E^a$ | 12:0 | 14:0 | 16.0 | 18:0 | 18:1 | 18:2 | 18:3 | $I^b$ | $r^2$ | SE |
| C7 | 5.46 | — | — | — | — | — | — | 155 | 0.752 | 20.10 |
| C8 | — | 14.02 | — | — | — | — | — | 151 | 0.800 | 18.60 |
| C9 | — | — | 1.94 | — | — | — | — | 192 | 0.064 | 40.40 |
| C10 | — | — | — | 5.81 | — | — | — | 170 | 0.004 | 41.67 |
| C11 | — | — | — | — | 3.39 | — | — | 216 | 0.324 | 34.32 |
| C12 | — | — | — | — | — | 90.60† | — | 240 | 0.655 | 24.51 |
| C13 | — | — | — | — | — | — | 29.93 | 185 | 0.050 | 40.68 |

$^a$Equation, Regressions C7, C8, C11, C12 were significant at p < 0.001.
$^b$Intercept of the regression equation $r^2$ is a measure of the total variance explained by teh regression equation, SE is the standard error around the regression line.
†Indicates a log function Myristic and linoleic acids had opposite effects. i.e., cholesterol-raising and cholesterol-lowering, respectively. FIG. 16(a) shows the effect on myristic acid on cholesterol plasma levels. In addition, the logarithmic nature of the response to 18:2 indicated a nonlinear relationship existed between increasing 18:2 intake and the observed plasma cholesterol (see FIG. 16b). Although not a true dose-response curve for 18:2 (because increased % energy from 18:2 was simultaneously coupled with decreased % energy from other fatty acids), FIG. 16b nevertheless serves to illustrate the physiological impact of 18:2 on the nonlinear relationship described by Equation C8. It is apparent from FIG. 16b that increments of 18:2 reach a "threshold" beyond which further increases exert minimal impact on the plasma cholesterol level.

The simplest, most inclusive multiple regression equation obtained by including two or more fatty acids (Eqn C14) revealed a regression coefficient of 0.92, and was based on the % energy derived solely from myristic and linoleic acids which explained 92% of the variation ($r^2$) in plasma cholesterol. The standard error about the regression was 12.6 mg/dL. The constant term (192) represents the "baseline" cebus plasma cholesterol value independent of any dietary fat effect.

$$PC = 192 + 10 \, E_{14:10} - \log E_{18:2} \quad r^2 = 0.92 \tag{C14}$$

The observed plasma cholesterol values plotted against the plasma cholesterol predicted by Eqn C14 are depicted in FIG. 17.

Inclusion of one or two additional fatty acids, as well as 14:0 and 18:2 failed to improve the predictability. Therefore Eqn C14 is predictive of cholesterol levels. The logarithmic term in Eqn C14 indicates a nonlinear response attributable to 18:2 intake.

FIG. 18 provides the simplest graphic illustration of the dietary fatty acid-plasma cholesterol relationship described by Eqns C14 and H1 (see below), by plotting the ratio of the % energy from 18:2/14:0 against the observed plasma cholesterol. The decrease in plasma cholesterol with an increasing 18:2/14:0 ratio exhibits a plateau (or threshold) effect. Once this threshold is reached, no further change in cholesterol is achieved. Numerous other practical combinations of fatty acids were regressed against the observed cholesterol value but none improved upon this simple ratio.

EXAMPLE 4

Human Data

The above analysis of data from cebus fed cholesterol-free diets suggested that a) all saturated fatty acids (12C–18C) are not the same, b) the principal cholesterol-raising and cholesterol-lowering fatty acids are myristic and linoleic, respectively, and that c) palmitic, oleic, and stearic acids are neutral. In the most comprehensive study to date in human subjects (36 diets) where individual dietary fatty acids are reported, Hegsted and coworkers (17 Am. J, Clin. Nutr. 17, 281, 1965) derived a relationship (Eqn H1).

$$\text{Delta } SC = 8.45 \text{ Delta } E14:0 + 2.12 \text{ Delta } E16.0 - 1.87 \text{ Delta } E18:2 + 0.056 \text{ Delta } C - 6.24 \tag{H1}$$

This equation, with a multiple regression coefficient of 0.951, explained about 95% of the observed variation in serum cholesterol. Similar to the above cebus data, changes in myristic acid alone explained much of the total variation (69%) in the human serum cholesterol response. In addition to myristic acid, equation H1 assigned a modest cholesterol-raising role to both palmitic acid and dietary cholesterol.

In contrast to the cebus diets, the human diets also contained dietary cholesterol (range 106–686 mg per day), which is known to down-regulate LDL receptors. The human data were reanalyzed for a possible dietary cholesterol ×dietary fatty acid interaction. This analysis revealed that the greatest deviation between observed and predicted serum cholesterol (based on Eqn H1) was attributable to diets with >400 mg cholesterol. Accordingly, the human data were split into two dietary groups, those receiving either <400 mg (range 116–306 mg;n=19) or >400 mg (range 437–686 mg; n=17) cholesterol per day. The cholesterol intake of the former group would presumably have minimal impact on LDL receptor status whereas some degree of down-regulation might be attributed to dietary cholesterol in the latter group.

When contributions from both dietary cholesterol and palmitic acid were ignored, 85.4% of the variation in serum cholesterol could be explained solely by the intake of 14:0 and 18:2 (Eqn H5). Thus, with cholesterol intake <400 mg (and presumably LDL receptor activity not compromised), inclusion of 16:0 and/or dietary cholesterol failed to improve the predictability after 14:0 and 18:2 had been considered, a finding comparable to the cebus data.

Delta $SC$=9.10 Delta $E_{14:0}$–1.78 Delta $E_{18:2}$–10.15     (H5).

Therefore, the simplest equation for this group of humans with limited dietary cholesterol intake (Eqn H5) is very similar to that for cebus monkeys (Eqn C14). FIG. 19 compares a plot of the observed serum cholesterol for the 19 diets from the low-cholesterol group (<400 mg per day) with that predicted on the basis of Eqns H5 and H1. The fit of the data based on Equation H5 (using only 14:0 and 18:2) was comparable to that based on Eqn H1 (using 14:0, 16:0, 18:2 and dietary cholesterol).

When dietary cholesterol intake exceeded 400 mg per day, the regression equation based solely on 14:0 and 18:2 intake (Equation H6) accounted for 83.6% of the observed variation in serum cholesterol (r=0.914).

Delta$SC$=7.50 Delta$E_{14:0}$–2.45 Delta $E_{18:2}$+10.89     (H6)

By contrast, the original regression equation (Eqn H1) that included 14:0, 16:0, 18:2 and dietary cholesterol accounted for 93% of the variation and is superior for predicting the serum cholesterol response in this group with a high cholesterol intake. Thus, inclusion of 16:0 in the regression at the higher intake of dietary cholesterol appears to improve predictability.

Referring to FIGS. 16 and 18, the response in plasma cholesterol to changes in dietary 18:2 appeared nonlinear. Although these figures do not represent classic dose-response curves because changes in dietary energy from a particular fatty acid are necessarily accompanied by changes in other fatty acids as well, the association with dietary 18:2 was the only nonlinear relationship observed in both monkeys and humans. Thus, the "threshold" concept seems reasonable, i.e., the "threshold" (% energy) of 18:2 needed to counteract a specific saturated fatty acid (14:0) varies depending on the % energy of 14:0 present.

This threshold concept is more appropriate than prior equations which describe linear relationships and imply that the plasma cholesterol can increase or decrease indefinitely. Empirical observation and physiological constraints suggest that the latter situation is not the case, since the observed plasma cholesterol in primates typically ranges between fixed limits (110–350 mg/dL). By the same token, an upper threshold in the response to myristic acid at high intakes is predicted. However, in practical terms with real fats, it is not possible to exceed 6–7% energy from dietary myristate (as coconut oil).

Fortunately, essentially all practical human diets supply 14:0 and 18:2 within the range of the most dynamic portion of the curve in FIG. 18. Thus, the opportunity exists to maximize the dietary fat-associated reduction in plasma cholesterol by manipulating the intake of these two fatty acids. FIG. 16b implies that once the plateau of the curve is reached (5–6% energy as 18:2 in most cases, but as low as 2–3% energy in the absence of dietary 14:0 and cholesterol), the composition of additional dietary fatty acids may not matter. This would explain why 18:1 and even 16:0 appear to substitute for 18:2 once the threshold for 18:2 is exceeded. Furthermore, in practical dietary situations (i.e., those with modest intake of 14:0) in normocholesterolemic individuals (<200mg/dL) consumption of 18:2 in excess of 5–6% energy would be without appreciable beneficial effect and could have detrimental effects (i.e., would be superfluous). The cebus data, like the human data further suggest that 16:0 and 18:1 exert minimal influence on the plasma cholesterol concentration, emphasizing the neutrality of these two fatty acids (the main fatty acids in human diets) in normal individuals (man and animals). In this case, "normal" refers to an up-regulated LDLr activity reflected by a plasma cholesterol concentration less than 200 mg/dL (LDL<130 mg/dL).

The acute-slope regression in FIG. 18 shows that small increments of dietary 14:0 are extremely cholesterolemic when consumed by sensitive individuals (or species) at low thresholds of 18:2. Although 14:0 is often discounted because of its relatively low intake (i.e., typically 0–2% total dietary energy), the rapid rise in total cholesterol over this range of 14:0 at a fixed low threshold of 18:2 suggests that 14:0 is the most potent fatty acid contributing to the saturated fat effect and that the 18:2 threshold would exert a counterbalancing effect only as 18:2 consumption increased from 2–6 energy % i.e., the range found in diets of most populations.

These data thus indicate, as discussed above, that fatty acid intake should be maintained in a proper balance between 18:2 and 14:0 intake, i.e., within the ratio described above for normocholesterol individuals. Thus, blends of fats having such a ratio are useful in aiding an individual to maintain this ratio, and to consume food with high metabolic value.

EXAMPLE 5

Prototype Blends

Prototype blends by weight of selected vegetable oils with cholesterol-reduced tallow necessary to produce an 18:2/14:0 ratio of at least 5:1 that will assure maximal lowering of plasma cholesterol by the resulting shortening blend are shown in Table 4. Ratios in parenthesis represent blends that produce an 18:2/14:0 ratio of approximately 3:1, allowing neutralization of the typically cholesterolemic effect of cholesterol-reduced tallow when consumed by humans. A sample calculation is as follows: one part by weight sunflower oil containing 66% by weight 18:2 (see USDA Handbook No. 18–4, *Composition of Foods-Fats and Oils, Raw Processed Prepared* 1979) blended with eight parts cholesterol-reduced tallow (containing 4% by weight 18:2 and approximately 3.7% by weight 14:0) yields a blend having an 18:2/14:0 ratio as follows: (1×66%+8×4%) divided by 8×3.7%=3.3:1).

TABLE 4

| Blend Constituents | Blend Proportions |
|---|---|
| Stripped tallow: soybean oil | 3.5:1 (7:1) |
| Stripped tallow: corn oil | 3.5:1 (6:1) |
| Stripped tallow: canola oil (rapeseed) | 1.8:1 (4:1) |
| Stripped tallow: sunflower oil | 4.0:1 (8:1) |
| Stripped tallow: palm olein | 1.0:1 (2:1) |
| Stripped tallow: peanut oil | 2.0:1 (4:1) |
| Stripped tallow: safflower oil | 4.5:1 (9:1) |
| Stripped tallow: cottonseed oil | 3.0:1 (6:1) |

TABLE 5

| Food Categories | Individual Products |
|---|---|
| Spreads | Margarine |
| | Butter |
| Fats and Oils | Shortening for baking |
| | Cooking oil |
| French Fries | |
| Fried Chicken | |
| (or Chicken Nuggets) | |
| Ready-to-Eat Baked | Muffins |

TABLE 5-continued

| Food Categories | Individual Products |
| --- | --- |
| Goods | Breads |
|  | Rolls |
|  | All purpose baking mixes |
|  | (e.g., Bisquick ®) |
| Ready-to-Eat Snacks | Cookies |
|  | Crackers |
| Snack Chips | Potato Chips |
|  | Corn Chips |
|  | Tortilla Chips |
|  | Popcorn with Topping |
| Dressings & Sauces | Salad Dressing |
|  | Dressings for Salads |
|  | Mayonnaise |
|  | Pasta Sauces |
| Dairy Products | Ice cream |
| (May be more than one | Ice cream novelties |
| category) | (incl. sandwiches) |
|  | Cheeses |
|  | Process cheese |
|  | Milk (1% and 2%) |
|  | Sour cream |
|  | Cream Cheese |
|  | Creams |
| Pizza |  |
| Ground beef |  |
| Sausage (All types) |  |
| Eggs |  |
| Desserts | Puddings |
|  | Pies |
|  | Cheese cake |
|  | Whipped topping |
| Breakfast Items | Cereals (esp. granola |
|  | Waffles |
| Popcorn with Topping |  |

Other embodiments are within the following claims.

EXAMPLE 6

Oxidative Stability

Cholesterol removed tallow was blended with MAZOLA™ corn oil purchased at a grocery store to produce blends containing from 50 to 95% cholesterol removed tallow. Blends were submitted for testing by the Oxidative Stability Index method. The results are shown in FIG. 20, in which the x-axis indicates the % content of tallow in the blend. The component corn oil and cholesterol removed tallow were also tested individually by themselves without blending. The results are shown in the graph as a corn oil baseline and cholesterol removed tallow baseline. As shown in FIG. 20, the blended fats exhibit a stability greater than either of the individual components alone.

We claim:

1. An oxidation-resistant fat-oil blend comprising a cholesterol-reduced animal fat having myristic acid, wherein the cholesterol-reduced animal fat comprises less than 40 mg cholesterol per 100 grams animal fat and a vegetable oil having linoleic acid; wherein said fat-oil blend provides oxidation-resistance and has a weight ratio of myristic acid:linoleic acid greater than that of the cholesterol-reduced animal fat alone.

2. The blend of claim 1 wherein between 50% and 99.9% of the cholesterol has been removed from said animal fat.

3. The blend of claim 1 wherein said cholesterol-reduced animal fat contains less than 10% of its original cholesterol content.

4. The blend of claim 1 wherein said weight ratio of said fat to said oil is selected to provide a blend whose stability to oxidation upon heating to a temperature of 100° C. or greater in air is increased at least 25% compared to said oil heated separately from said fat.

5. The blend of claim 1 wherein said animal fat is selected from the group consisting of tallow, lard, butter fat, egg fat, milk fat, mutton fat, chicken fat, and turkey fat.

6. The blend of claim 1 wherein said vegetable oil is selected from an oil comprising linoleic acid.

7. The blend of claim 6, wherein said oil is selected from the group consisting of safflower oil, sunflower oil, corn oil, soybean oil, cottonseed oil, peanut oil, canola oil, and olive oil.

8. The blend of claim 1 wherein said blend comprises cholesterol-reduced tallow, and an oil selected from the group consisting of: soybean, cottonseed, corn, canola, sunflower, palm olein, safflower and peanut.

* * * * *